US012560442B2

(12) United States Patent
Dasher et al.

(10) Patent No.: US 12,560,442 B2
(45) Date of Patent: Feb. 24, 2026

(54) SMART TRANSACTION SYSTEM WITH IoT INTEGRATION FOR PURCHASE REQUESTS

(71) Applicant: Adeia Guides Inc., San Jose, CA (US)

(72) Inventors: Charles Dasher, Lawrenceville, GA (US); Reda Harb, Tampa, FL (US); Aldis Sipolins, Somerville, MA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/680,980

(22) Filed: May 31, 2024

(65) Prior Publication Data

US 2025/0369760 A1      Dec. 4, 2025

(51) Int. Cl.
| | |
|---|---|
| *G06Q 30/0601* | (2023.01) |
| *G01C 21/34* | (2006.01) |
| *G06Q 20/40* | (2012.01) |
| *H04L 67/306* | (2022.01) |

(52) U.S. Cl.
CPC ......... *G01C 21/343* (2013.01); *G06Q 20/401* (2013.01); *G06Q 30/0633* (2013.01); *H04L 67/306* (2013.01)

(58) Field of Classification Search
CPC ............... G01C 21/343; G06Q 20/401; G06Q 30/0633; H04L 67/306
USPC ....................................................... 701/533
See application file for complete search history.

(56) References Cited

U.S. PATENT DOCUMENTS

| | | | | |
|---|---|---|---|---|
| 9,346,365 | B1 * | 5/2016 | Penilla .................... | B60L 53/14 |
| 11,488,125 | B2 * | 11/2022 | Hammad ............. | G06Q 20/102 |
| 2014/0156450 | A1 * | 6/2014 | Ruckart ............. | G06Q 30/0639 |
| | | | | 705/26.8 |
| 2022/0051310 | A1 * | 2/2022 | Graube .............. | G06Q 30/0633 |
| 2025/0265619 | A1 * | 8/2025 | Harb ..................... | G06Q 50/01 |

OTHER PUBLICATIONS

Stripe Inc, "Merchant category codes (MCCs): What they are and why they matter", available online at <https://stripe.com/in/guides/merchant-category-codes>, retrieved on Jun. 12, 2024, 9 pages.

* cited by examiner

*Primary Examiner* — Phutthiwat Wongwian
(74) *Attorney, Agent, or Firm* — HG LAW LLP

(57)      ABSTRACT

Systems and methods of a smart transaction system with IoT integration for purchase requests by way of a cohesive interface integrating IoT systems, navigation systems, and virtual payment systems are disclosed. Initiation of a navigation route for a navigation device associated with a user of a household is detected. An IoT device-managed shopping list shared with one or more user devices associated with the household is accessed. A nearby merchant which sells items from the shopping list is identified. A route deviation score for the merchant location is determined based on the navigation route. If the route deviation score does not meet or exceed a predetermined deviation threshold associated with the navigation device, the shopping list and navigation instructions to the merchant location as an intermediary stop on the route are transmitted to the navigation device. A digital financial transaction for a user device associated with the user is enabled, with restrictions based on a provided shared virtual payment method, at the merchant location.

20 Claims, 11 Drawing Sheets

SMART TRANSACTION SYSTEM WITH IoT INTEGRATION FOR PURCHASE REQUESTS

BACKGROUND

This disclosure relates to providing smart transactions and navigation for purchase requests associated with an IoT device-managed shopping list.

SUMMARY

Internet-connected devices (e.g., Internet of Things (IoT) devices), such as smart refrigerators and voice-assisted devices (e.g., Amazon Echo, Google Home, and Apple HomePod) often feature capabilities for creating and managing shopping lists (e.g., lists that include items ranging from groceries to household essentials). Such shopping lists can typically be shared among a plurality of user devices (e.g., corresponding to users in a household) connected with such IoT devices. Sometimes, users of such user devices want to coordinate which user should purchase which items in a manner that is most convenient for all household members (e.g., optimal or most efficient use of the user's time given their current location or current route), which can be determined by navigation systems (such as navigation systems operating on the user's device). Moreover, a user may want to authorize another user to use a virtual payment method and/or implement restrictions on the virtual payment method for purchasing such items (e.g., by way of a virtual payment system). However, there is no interface that connects these three systems such that the systems can communicate with each other and operate cohesively. The lack of a cohesive interface connecting modern IoT systems, navigation systems, and virtual payment systems can result in inaccuracies or inefficiencies of IoT devices, in devices on which navigation systems are operated, as well as security risks of virtual payment systems.

For example, while a smart refrigerator may alert users when milk needs to be purchased, such IoT systems do not consider the real-time location or current navigation route of each user would have to travel to a particular merchant to purchase the milk. In another example, while a voice-assisted device may remind users to purchase batteries, bread, and butter, such IoT systems cannot determine which items can be grouped together and purchased at a particular merchant (e.g., bread and butter can be purchased together at a grocery store), and whether it would be appropriate or optimal to operate a navigation system on a particular user's device instead of another user's device, based on each user's real-time location and/or current navigation route.

For example, determining shopping requests among household members (e.g., tasks identifying which item should be purchased, from which merchant the item should be purchased, and which user should carry out the shopping request) is prone to errors and inefficiency when the user devices associated with household members are in different locations at different times. User devices being in different locations at different times and moving along different routes can lead to not getting the most current or accurate location information of each user device, which can result in designating a shopping request that is inconvenient to one user but would have been less inconvenient for another user. The lack of a cohesive interface can also result in duplicating efforts (e.g., two household members purchasing the same item) and overlooking the purchase of an item (e.g., all household members assuming another member will purchase the item, resulting in the item never being purchased).

For example, because IoT devices are separate from (e.g., not communicatively connected with) the navigation systems of the user devices, the IoT devices are not be able to determine in real time to which user to delegate a shopping request in a manner that is most convenient to the user based on the user's current location or current route (e.g., whether a merchant selling an item is located along the current route of the user). In another example, a situation where two users in different locations inadvertently and separately decide to shop for the same item from the shopping list, may result not only in duplicate purchases, but also in excess navigation sessions running unnecessarily on multiple devices. In another example, because the IoT device does not track a user's current location or route, it may not detect that a merchant carrying an item from the shopping list is conveniently located along the user's route, and thereby fail to inform the user of an optimal time to purchase the item, and the item remains unpurchased. Such result is particularly undesirable if the item is an urgent or priority item which needs to be purchased within a certain period of time.

In another example, a parent may want to share a virtual credit card with other members of the household but apply customized restrictions (e.g., budget adherence such as spending limits, security restrictions such as merchant-specific purchases). However, while modern IoT systems may offer some digital wallet integration and transaction capabilities, they do not provide personalized or secure methods of sharing transaction abilities within a household.

In one approach, users can, by way of their user devices connected to the IoT device, manually modify the shared shopping list with notes to update all members of the household as to which user should purchase certain items and/or at a particular merchant, and which items have already been purchased. However, such techniques do not capture the real-time current location of each user, nor does it ensure that the shared notes as to the status of the items (e.g., purchased or unpurchased, urgent) or location of each user are current or accurate.

In one approach, users can share their schedules with each other, such as by allowing each other access to their virtual calendars, to determine which household member has time to make a purchase. However, sharing access to virtual calendars does not provide a real-time current location of each user to determine whether carrying out a shopping request is convenient to the user.

In one approach, a primary cardholder in a household can maintain a virtual credit card and add sub-users to their virtual credit card for making purchases. For example, a parent can add their child as a sub-user, which permits the child to use the parent's virtual credit card. However, while the parent can configure which sub-user is authorized to use the virtual credit card and set a maximum transaction limit, such techniques do not implement restrictions on a purchase transaction based on the shopping request. For example, such techniques do not discriminate which items to purchase or from which merchants to purchase such items. Moreover, adding an authorized sub-user requires multiple security steps, resulting in inefficiencies in the virtual payment system. For example, the primary cardholder may be required to authenticate the virtual credit card through the appropriate banking institution or input and validate a PIN or other security code or perform a multi-factor authentication process. This can in turn require a sub-user to wait for the primary cardholder's authentication before the sub-user can complete a transaction. Moreover, the virtual credit card may be associated with an authentication window. Thus, if the primary cardholder fails to validate addition of the sub-user to their account within the window, the window can expire before the sub-user can complete a payment transaction. For example, the primary cardholder may be required to enter a unique code from the service provider, but transmission delays in delivering the code from the service provider to the primary cardholder could result in delays in authenticating the account within the required time window, thereby temporarily locking the account. Furthermore, simply authorizing sub-users to one's virtual credit card does not guarantee that the primary cardholder can monitor or control in real time the purchases made on the virtual credit card (e.g., identify items purchased or the identify the merchant where the purchase was made). For example, adding someone as an authorized sub-user gives the sub-user the latitude to make multiple transactions and at any time that the sub-user desires. If the cardholder wanted to monitor the sub-user's user of the virtual credit card, the cardholder would need to perform an audit of the transactions retroactively and reverse unauthorized charges that have already been processed. Therefore, the cardholder has less control over how and when others use his virtual credit card.

In one approach, merchants can provide delivery service of items purchased through their online store. However, in such approach, the items need to be purchased from those merchants that deliver, thereby limiting the vendors available for fulfilling the shopping request and restricting users from purchasing items from their preferred vendors. Such approach also does not make purchases based on the most convenient time and location of a user.

In one approach, the services of a third-party personal shopper and delivery platform can be requested to make purchases from a shopping list from a variety of merchants. However, such approach also does not make purchases based on the most convenient time and location of a user. For example, some items on a shopping list may be needed within a certain time frame, but the third-party services are not available because they rely on the availability of a workforce associated with the service in a given geographical region. Such approach also does not provide purchase and delivery of items in a customized manner. For example, a user may wish to purchase an item from their preferred store or exercise personal discretion in selecting items within a store. However, such third-party personal shopper and delivery platforms may not be integrated with or have a business relationship with the preferred store, and personal shopping discretion is difficult to enforce on a third party.

To solve these problems, systems and methods described are provided herein for providing a cohesive interface connecting IoT systems, navigation systems, and virtual payment systems. In some approaches, a family pickup interface (FPI) is provided, by way of a home grouping application (HGA), for connecting the three separate systems. The family pickup interface and the home grouping application may be executed at least in part at one or more remote or local servers (e.g., a server associated with a service provider of the IoT device), computing devices (e.g., user devices communicatively connected with the IoT device), other IoT devices (e.g., other IoT devices communicatively connected with the IoT device that manages the shared list) and/or at or distributed across any one or other suitable computing devices, in communication over any suitable type of network (e.g., the Internet, local wireless network, cloud-based service).

In one embodiment, the HGA detects initiation of a navigation route associated with a navigation device of a user. The HGA accesses at least one list of a plurality of shopping items, wherein at least one of the shopping items was added to the list by an IoT device. The HGA identifies a merchant location selling the shopping items. The HGA determines a route deviation score for the merchant location based on the navigation route and whether the score meets or exceed a predetermined deviation threshold associated with the user device. For example, the predetermined deviation threshold associated with the user device may correspond to a convenience level of the user of the navigation device. If the score does not meet or exceed that threshold, the HGA: (i) transmits data describing the at least one of the plurality of shopping items; (ii) transmits data causing the merchant location to be added as an intermediary stop on the route; and (iii) enables a digital financial transaction for the user device at the merchant location. For example, transmitted data describing the at least one of the plurality of shopping items may be transmitted as a notification comprising a purchase request to the navigation device and/or user device.

In one embodiment, different lists of shopping items may be maintained by the IoT device. For example, different members of the household may then be associated with one or more lists. Shopping item lists may also be classified as 'eCommerce' or 'Pick up.' Items on the eCommerce list are ordered online, while items on a 'Pick up' list are assigned to one or more members of a household for purchase/pick up. The HGA may select items from multiple 'Pick up' lists for household members that are associated with the multiple lists.

In some embodiments, the navigation device and the user device are the same device.

In some embodiments, the HGA authorizes the user device to use, for the digital financial transaction, a virtual payment method associated with a second user. Payment security for the virtual payment method is activated based on at least one restriction associated with the digital transaction. Restrictions may be determined based on metadata associated with the virtual payment method, the metadata including at least one of: a transaction amount limit, a time limit, an age limit, merchant identity, merchant location, a limit on a type of item, or a limit on a quantity of an item.

In some embodiments, the predetermined deviation threshold is determined based on at least one of: a predicted location of the user at a given time, a distance between the location of the merchant and the current location or predicted location of the navigation device, historical navigation route data of the navigation device, user preferences associated with the navigation device, a current mode of transportation of the navigation device, a destination of the item, a destination of the navigation route, a priority level associated with the item, or environmental condition data.

In some embodiments, the predicted location is determined based on historical shopping behavior associated with a user profile associated with the navigation device, preferred routes associated with the user profile, frequented merchants within a period of time associated with the user profile.

In some embodiments, shopping items are grouped based on at least one of an item category, a merchant category, or a priority level. In some embodiments, the metadata associated with the shopping request further identifies the plurality of items.

In some embodiments, the navigation route is updated based on the merchant location and a mode of transportation of the navigation device.

In some embodiments, the FPI sends a notification to each of a plurality of user devices confirming that the data describing the at least one of the plurality of shopping items has been transmitted to the user device. The FPI provides each of the user devices with an option to update the shopping items. In response to receiving a selection to update the shopping items, the HGA (e.g., by way of the FPI) may cause the IoT device to update the shopping list with the updated shopping items.

In some embodiments, items are added by each of the user devices to the list of items by way of the IoT device. The list may identify which user device added each item in the plurality of shopping items. The HGA may restrict addition of items to the plurality of shopping items based on the identified user device.

In some embodiments, the HGA may identify the merchant by determining that the at least one item is available for purchase at the merchant location and that the merchant location offers an option to pick up the at least one item; and by determining that an estimated time for pickup of the at least one item at the merchant location corresponds with an estimated arrival time of the user device at the merchant location.

In some embodiments, the shopping items may be added to the shopping list based on voice command input received by the IoT device.

A benefit of the described systems and methods includes improved security and enforcement of restrictions on the virtual payment method. By determining and applying restrictions to the virtual payment method based on metadata associated with the shopping request, the described systems and methods protect virtual payment methods against unauthorized transactions, especially in situations where the virtual payment account holder (e.g., primary cardholder) has authorized a particular user(s) to use their virtual payment method. Thus, the authorized user can use the cardholder's virtual credit card in a digital transaction under a one-time authorization, so long as the transaction meets (e.g., does not violate) the restrictions of the virtual credit card.

Another benefit includes reducing timeouts or lockouts from a virtual payment method account due to strict digital security mechanisms, such as multiple authentication steps that must be performed correctly but that are also prone to errors (e.g., user error, delays in transmission of authentication codes). By applying restrictions to the virtual payment method based on metadata associated with the shopping request, the described systems and methods can constrain use of the virtual payment method (e.g., by the primary cardholder or by another user) to a specific transaction associated with the shopping request, thereby removing the need for multiple or excessive authentication or other security steps before the virtual payment method can be validated for use.

A further benefit includes preventing an authorized user from using the cardholder's virtual payment method for multiple transactions or from using it at any time beyond the transaction that was authorized and its restrictions. By providing a one-time authorization to use the virtual payment method, the cardholder can prevent unauthorized transactions before they occur and the virtual payment method also remains protected by the security restrictions associated with the one-time authorization. Also, the one-time authorization can be reactivated or provided again for the authorized user for another future transaction without having to go through repeated and excessive security or authentication steps again. The one-time authorization for the authorized user can also be updated with different restrictions for different future transactions.

Yet another benefit includes efficient use of navigation systems on user devices. For example, suppose a first user embarks on a shopping request that is inconvenient for them (e.g., detouring to the merchant would require traveling a longer distance or for a longer period of time than indicated by user preferences) but would otherwise be more convenient for second user (e.g., the merchant is located along the current path of the second user). This may result in unnecessary operation of the navigation system on the first user's device and, moreover, unnecessarily complicated calculations (or recalculations) performed by such navigation system. By determining, based on a current location of a user device that the location of a merchant meets a level of convenience of the user, the shopping request is assigned to a user in a manner which optimizes the time and location of each user for making such purchases. Causing the navigation system of the assigned user to update the navigation path based on the metadata of the shopping request (and/or the merchant location) can result in more efficient operation of the navigation system on the assigned user's device and more efficient rerouting calculations performed by the navigation system.

BRIEF DESCRIPTION OF THE FIGURES

The present disclosure, in accordance with one or more various embodiments, is described in detail with reference to the following Figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1A:
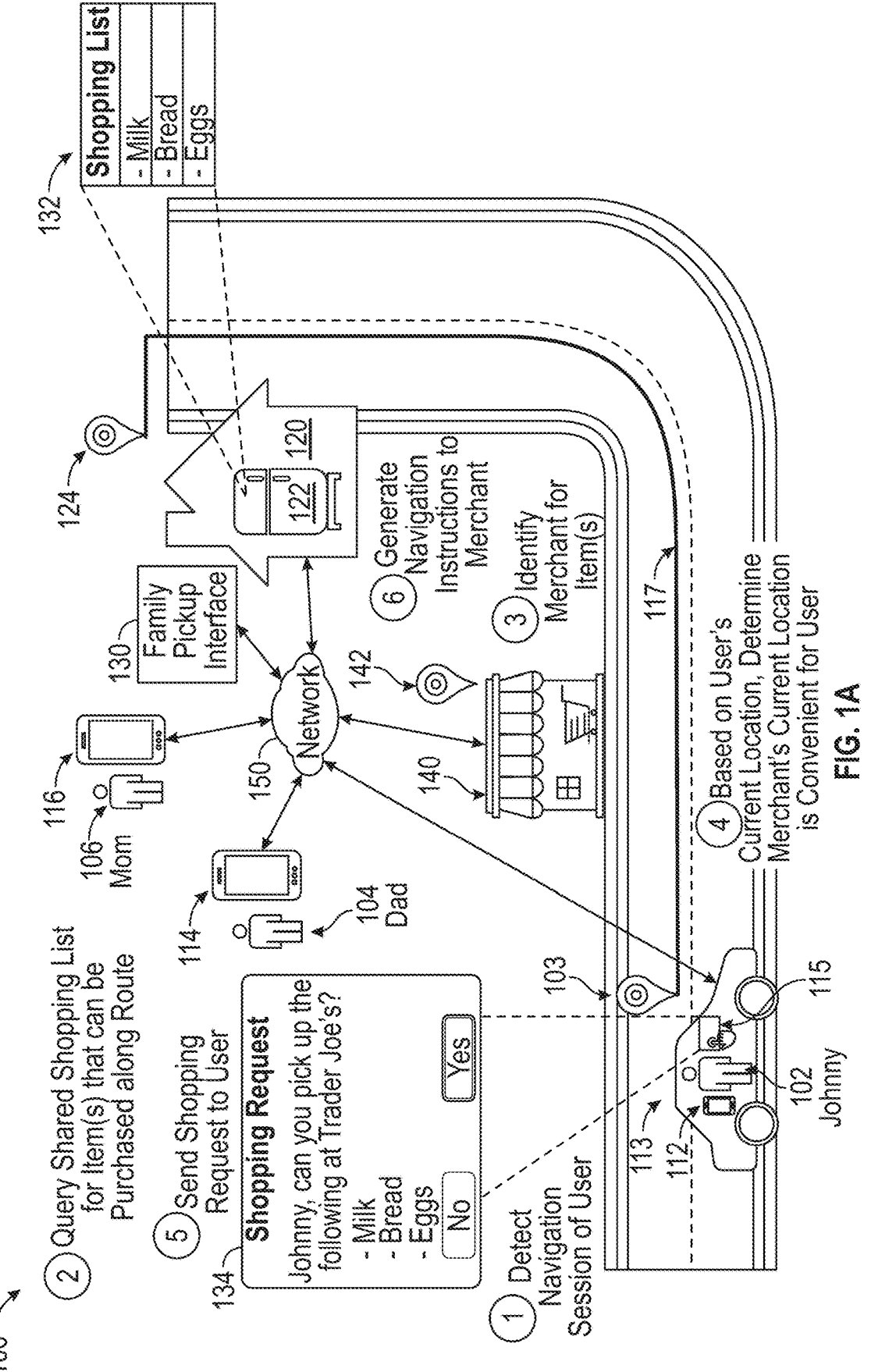
FIG. 1A shows an example scenario of selecting a user and merchant for fulfilling a purchase request using a cohesive interface integrating IoT systems, navigation systems, and virtual payment systems, in accordance with various embodiments of this disclosure.

FIG. 1A shows an example scenario 100 of selecting a user and merchant for fulfilling a purchase request using a cohesive interface integrating IoT systems, navigation systems, and virtual payment systems, in accordance with various embodiments of this disclosure. In some embodiments, a Home Grouping Application (HGA) provides a Family Pickup Interface (FPI) 130 which integrates various systems (e.g., IoT system, navigation systems, virtual payment systems) associated with a user or plurality of users (e.g., a household comprising users 102, 104, and 106), by way of network 150. In some embodiments, the HGA is executed at least in part at one or more remote or local servers (e.g., server 404 and/or 424 of FIG. 4), and/or at database 405 and/or 425 of FIG. 4, and/or computing devices (e.g., user devices 112, 114, 116, smart refrigerator 122, smart vehicle 113, or computing device 300, 301 of FIG. 3, or devices 407, 408, 410, 412 of FIG. 4), and/or at or distributed across any one or more other suitable computing devices, in communication over any suitable type of network (e.g., network 150, the Internet or local wireless network or communication network 409 of FIG. 4).

In an example, an IoT system may include IoT devices associated with the user or plurality of users and/or their home 120, such as smart refrigerator 122, user device 112, user device 114, user device 116, smart vehicle 113, a smart home speaker, or other suitable IoT device. In an example, navigation systems may include a navigation system of vehicle 113, respective navigation systems of user devices 112, 114, 116, or other suitable navigation system associated with a device communicatively connected with the IoT system. In an example, virtual payment systems may include respective virtual payment methods associated with each user 102, 104, 106, such as digital wallet 160 or virtual credit card 162 of FIG. 1B, or other suitable digital forms of payment.

In some embodiments, smart refrigerator 122 maintains a shared virtual shopping list among users 102, 104, 106. For example, smart refrigerator 122 may track its current inventory. When inventory of certain items run low or run out, smart refrigerator 122 may add such items to shopping list 132. Smart refrigerator 122 may also receive user requests to add or change items in shopping list 132. For example, members of the household can add shopping items or change items (e.g., quantity, brand, substitutes) by way of Family Pickup Interface 130. In some embodiments, FPI 130 asks for a particular merchant or provides suggested merchants at which to purchase the added shopping items. In some embodiments, additional IoT devices maintain inventory of items and/or respective lists of items to purchase, and the HGA generates a unified shared list of shopping items based on inventory data and/or shopping list data from each IoT device, the unified shared list being accessible to and editable by users 102, 104, 106 by way of FPI 130. For example, while smart refrigerator 122 maintains inventory of groceries and a list of grocery items for purchase, a smart home speaker may maintain inventory of household items and a list of household items to purchase. The HGA generates a unified shared list of shopping items based on inventory data and shopping list data from each IoT device.

In some embodiments, the HGA determines which user among the household to send a prompt to fulfill a purchase request (also referred to as a shopping request) for shopping items in the shopping list 132, based on the user's approximate location or navigational routing status. Selecting the user based on their location or navigational routing status results in selecting the member of the household who is optimally suited (e.g., the user from whom it would be most convenient or who would incur the least amount of inconvenience) to fulfill the purchase request. For example, the HGA periodically monitors the current location (or approximate location) of each user device 102, 104, 106, and determines whether they are currently in transit (e.g., initiated or engaged in a navigation session).

In some instances, at step 1 of FIG. 1A, the HGA detects initiation of a navigation session of vehicle 113 associated with user 102, based on location data (e.g., GPS data, proxied-location-based data) or navigation data of vehicle 113. Further based on the location data or navigation data of vehicle 113, the HGA determines that user Johnny 102, by way of vehicle 113, is traveling along navigation route 117 from his current location 102 to his destination 124 (e.g., home 120).

In some instances, at step 2 of FIG. 1A, the HGA accesses and queries shopping list 132 for shopping items (or a portion thereof) that can be purchased along navigation route 117.

In some instances, at step 3 of FIG. 1A, the HGA identifies a matching merchant or a set of matching merchants located along or within a certain range of navigation route 117 that sell the shopping items (or a portion thereof). Additionally, or alternatively, the HGA determines the location 103 of the user 102 (e.g., based on GPS data, proxied-location-based data) and determines whether the user is proximate to (e.g., within a certain range of) a matching merchant(s) that sells the shopping items. In some instances, the location 103 is a current location of user 102. In some instances, the location 103 is a predicted location of user 102. The predicted location may be where user 102 is expected to be located at a certain time, based on various factors, such as current navigation route, historical navigation routes, historical shopping behaviors, or user preferences.

In some instances, at step 4 of FIG. 1A, the HGA determines whether a matching merchant is convenient (or most convenient among a set of matching merchants) for the user to visit along their transit. For example, the user 102 may be associated with a predetermined deviation threshold, comprising a maximum distance (e.g., 5 miles, 10 miles, 15 miles) deviating from a given point along the navigation route 117 that is acceptable to the user 102. In another example, the predetermined deviation comprises a maximum period of time (e.g., 5 minutes, 30 minutes, 1 hour) added to the navigation time resulting from altering navigation route 117 that is acceptable to the user 102. The predetermined deviation threshold can be determined based on user input, user preferences, historical navigation routes, preferred routes, or historical shopping behaviors, or other suitable data associated with a user profile of user 102. The predetermined deviation threshold for a user may change based on the day or time of day. For example, user 102 may have a historical pattern of deviating 5 miles from his way home from school every Friday to purchase soda and snacks at merchant 140.

In some embodiments, each matching merchant is associated with a route deviation score based on the location of the merchant relative to the navigation route 117. For example, a route deviation score is calculated based on the distance between the merchant location 142 and a given point along the navigation route 117. The farther away the merchant is located from a given point along navigation route 117, the higher the route deviation score. In some alternative embodiments, user 102 may not have yet entered vehicle 113 and is not yet in transit. As such, the route deviation score of merchant 140 is based on the merchant location 142 and the user's current location 103 or predicted location (e.g., a distance between merchant location 142 and user's current location 103 or predicted location at a certain time). In some other alternative embodiments, the route deviation score of merchant 140 is based on a distance between the merchant location 142 and a given point along a predicted navigation route of user 102. The predicted navigation route of user 102 may be based on various factors, such as historic navigational routes, preferred routes, historic shopping behaviors, or frequented merchants associated with a user profile of user 102.

In some embodiments, the HGA compares the route deviation score of each matching merchant with the predetermined deviation threshold. If the route deviation score of the matching merchant is less than (e.g., does not equal or does not exceed) the predetermined deviation threshold, then the HGA selects that merchant as the location to prompt the user to visit when fulfilling the purchase request. For example, the HGA may identify merchant 140 as a store that sells items from shopping list 132 (e.g., milk, bread, eggs). The HGA calculates a route deviation score for merchant 140 based on the merchant's location 142 from a point along navigation route 117. The HGA retrieves the predetermined deviation threshold associated with user 102 and compares the threshold with the route deviation score for merchant 140. Upon determining that the route deviation score of merchant 140 does not meet or exceed the predetermined deviation threshold of user 102, the HGA selects merchant 140 as the location to prompt user 102 to visit when fulfilling the purchase request 134.

In some instances, at step 5 of FIG. 1A, based on determining the matching merchant that sells the item(s) in the shopping list 132 and that has a route deviation score lower than the predetermined deviation threshold associated with user 102, HGA selects user 102 as the optimal household member to fulfill the purchase request. Accordingly, HGA sends a notification to user 102 with the purchase request 134, prompting the user 102 to accept or decline the request. In some embodiments, the HGA transmits the shopping request 134 to an IoT device and/or a navigation system associated with user 102, such as via the infotainment system 115 of vehicle 113.

Figure 1B:
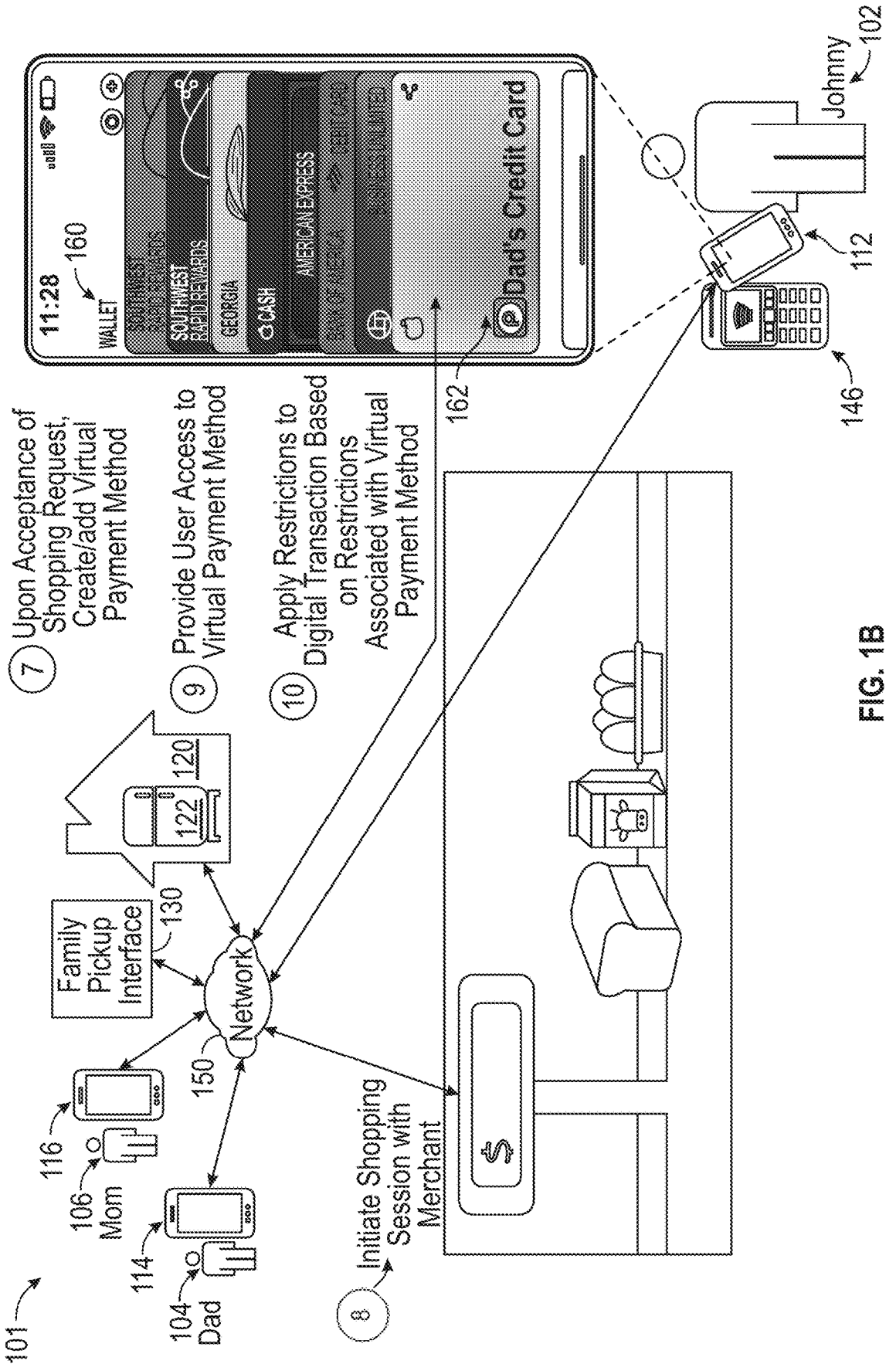
FIG. 1B shows an example scenario of providing a virtual payment method for smart transactions using a cohesive interface integrating IoT systems, navigation systems, and virtual payment systems, in accordance with various embodiments of this disclosure.

In some instances, at step 6 of FIG. 1B, when user 102 accepts the purchase request 134, the HGA generates navigation instructions for user 102 to navigate to merchant 140. For example, the HGA may update the current navigation route 117 to include merchant 140 as an intermediary destination. The HGA can additionally detect the user's mode of transportation (e.g., driving, bicycling, walking) and other factors (e.g., traffic conditions, weather conditions), and generate the updated navigation instructions based on those factors.

FIG. 1B shows an example scenario 101 of providing a virtual payment method for smart transactions using a cohesive interface integrating IoT systems, navigation systems, and virtual payment systems, in accordance with various embodiments of this disclosure. In some instances, at step 7 of FIG. 1B, based on user 102 accepting the purchase request 134, the HGA adds a virtual payment method (e.g., virtual card 162) to a digital wallet 160 associated with user's 102 device 112. In some embodiments, the virtual card 162 is a shared virtual credit card which belongs to (e.g., use of the virtual card 162 is controlled by) one user (e.g., user Dad 104) of the household and various other users (e.g., user Johnny 102) are conditionally and temporarily authorized to use the virtual card 162. For example, based on user preferences or user input of user Dad's 104 user profile, the HGA may add user Johnny 102 as an authorized user of the virtual card 162 for specific digital transactions, and may configure virtual card 162 with restrictions on digital transactions made by user Johnny 102.

Also in some instances, at step 8 of FIG. 1B, when user 102 accepts the purchase request 134, the HGA initiates a shopping session with the merchant 140. For example, the HGA may integrate the Family Pickup Interface 130 with a merchant API associated with the merchant 140. When the user 102 accepts purchase request 134, the HGA initiates a shopping session with merchant 140, such that the HGA can validate items being processed at checkout. In some examples, the FPI 130 may transmit a code for the user 102 (e.g., by way of a display on user device 112) and/or the merchant 140 (e.g., by way of the merchant API) to retrieve the shopping session or shopping list 132 when the user 102 is shopping at the merchant 140. When the user 102 checks out items that are picked up at merchant 140, the HGA can validate (e.g., by way of FPI 130 integrated with the merchant API) the items based on restrictions on the virtual card 162. The HGA can also validate the transaction in general based on restrictions on the virtual card 162 (e.g., use of the virtual card 162 is restricted to a particular spending limit for the total transaction cost irrespective of the individual items purchased). Implementations of restrictions on the virtual card 162 are described in further detail below.

In some instances, at step 9 of FIG. 1B, upon initiation of the shopping session, the HGA provides user 102 with access to the virtual card 162 (e.g., by activating the virtual card 162). For example, the HGA may temporarily activate virtual card 162 in user's 102 digital wallet 160, such that user 102 is authorized to make purchases for items from purchase request 134 during the shopping session at merchant 140. When authorized, user 102 can pay with his digital wallet 160 using virtual card 162 in the digital transaction, for example, by way of Point-of-Sale (POS) terminal 146.

In some instances, at step 10 of FIG. 1B, as the user 102 checks out items at merchant 140, the HGA applies purchase restrictions to the digital transaction based on restrictions associated with the virtual card 162. The HGA may determine the virtual card 162 restrictions based on metadata associated with the virtual card 162. Restrictions on virtual card 162 may include security restrictions, monetary restrictions, item restrictions, temporal restrictions, location restrictions, merchant restrictions, user restrictions, other suitable restrictions, or a combination thereof. For example, security restrictions on virtual card 162 may require the HGA to authenticate that an authorized user such as user 102 is making the purchase. Monetary restrictions may include a transaction amount limit. Item restrictions may include limiting use of virtual card 162 to purchase specific items or item alternatives (e.g., different brands or substitute items), or a specific amount (e.g., quantity) or no more than a maximum amount of certain items. For example, an item restriction on virtual card 162 may limit user 102 from purchasing any items other than what is listed in the shopping request (e.g., milk, bread, eggs), or prohibit certain items from being purchased (e.g., no junk food). Temporal restrictions may limit use of the virtual card 162 to specific times or dates or a time period. Location restrictions may limit use of the virtual card 162 to a specific location(s). Merchant restrictions may limit the use of virtual card 162 to a particular merchant(s), such as those merchants whose merchant ID may be mapped to a Merchant Category Code (MCC), or whose MCC matches those of merchants previously known to the HGA (e.g., based on previous transactions associated with user's 102 digital wallet 160). User restrictions may include limiting use of virtual card 162 based on characteristics in the user's profile, such as age (e.g., user 102 may be under 21 years old and cannot use virtual card 162 to purchase alcohol).

In some embodiments, restrictions on virtual card 162 change for different digital transactions. For example, restrictions on virtual card 162 may be implemented based on the purchase request. A first purchase request may be for milk, bread, and eggs to replenish groceries in the home. The HGA may configure virtual card 162 with a transaction amount limit of $50, a merchant restriction to a particular grocery store, and limit items purchased in the transaction to only milk, bread, and eggs. A subsequent purchase request may be for snow chains and roadside emergency kit to prepare for an upcoming family road trip. The HGA may reconfigure virtual card 162 with a transaction amount limit of $150, a merchant restriction to a particular auto parts store, and limit items purchased in the transaction to only snow chains and roadside emergency kit.

In some embodiments, some restrictions on virtual card 162 persist regardless of different digital transactions. For example, an age restriction or transaction amount limit may continue to apply to virtual card 162 regardless of the shopping request.

In some embodiments, when a digital transaction violates a restriction of virtual card 162, the HGA declines or cancels the digital transaction. For example, if the total amount of groceries exceeds the transaction amount limit (e.g., $50) or if user 102 attempts to purchase a restricted item (e.g., junk food), then the HGA will decline payment from virtual card 162, therefore not allowing the digital transaction to go through. In some embodiments, when validating a purchase (e.g., of an item or transaction amount) at checkout based on the restrictions, the HGA sends a notification to the virtual card 162 holder (e.g., user Dad 104) for approval or to override certain restrictions. In some embodiments, as a security measure, the HGA revokes user's 102 access to virtual card 162 after a certain number of attempts to make a purchase that violates a restriction of the virtual card 162. HGA may also send a notification to the cardholder (e.g., user Dad 104) when a digital transaction violates a restriction of their virtual card 162. In some embodiments, the HGA provides an option associated with the shopping session that allows for the shopper to request modification of the restrictions during the shopping session. For example, user 102 may realize prior to check out that the total amount for his purchase will exceed the transaction amount limit. The user 102 may send a request, by way of the HGA option, for modification of the transaction amount limit. The HGA transmits the request to the cardholder along with an option to approve or deny the request. The HGA then modifies restrictions on the virtual card 162 based on the cardholder's response.

In some embodiments, when the transaction is completed, the shopping session ends and the HGA removes user's 102 access to the virtual card 162. For example, the HGA may delete the virtual card 162 from user's 102 digital wallet 160. In another example, the HGA may leave the virtual card 162 in the digital wallet but deactivate the virtual card 162 until another shopping session with user 102 in the future.

Figures 2A, 2B:
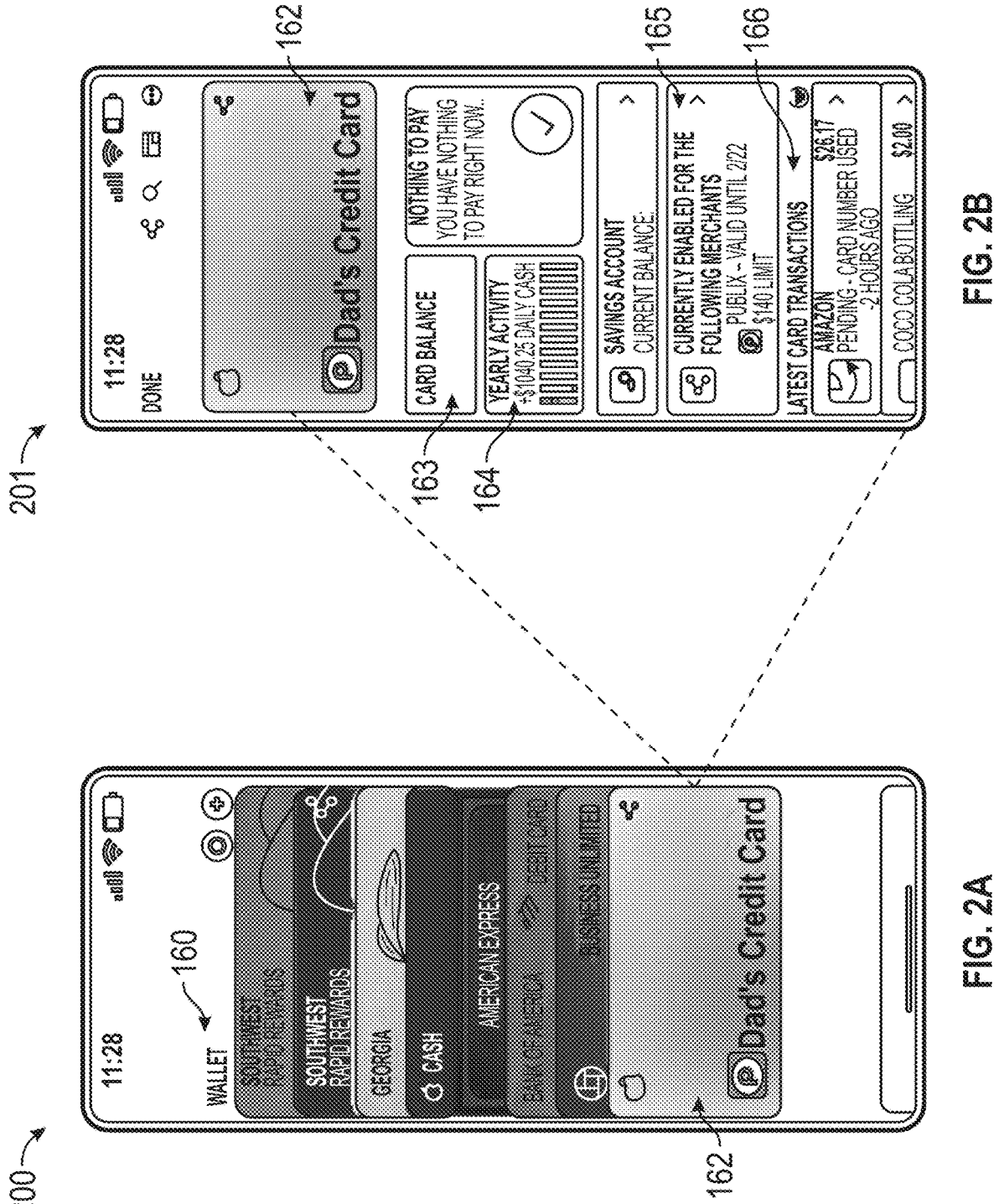
FIG. 2A shows an example user interface of a virtual payment method for smart transactions using a cohesive interface integrating IoT systems, navigation systems, and virtual payment systems, in accordance with various embodiments of this disclosure.
FIG. 2B shows another example user interface of a virtual payment method for smart transactions using a cohesive interface integrating IoT systems, navigation systems, and virtual payment systems, in accordance with various embodiments of this disclosure.

FIGS. 2A and 2B show example user interfaces 200, 201, respectively, of a virtual payment method for smart transactions using a cohesive interface integrating IoT systems, navigation systems, and virtual payment systems, in accordance with various embodiments of this disclosure. In some embodiments, users in the household are each associated with a digital wallet, to which the HGA adds a shared virtual payment method belonging to another user in the household. The shared virtual payment method allows household members to make purchases of items from an IoT device-maintained shopping list shared among the household. For example, user Johnny 102 is associated with digital wallet 160 on his device 112. The HGA adds virtual card 162 (belonging to user Dad 104) to user Johnny's 102 digital wallet 160 to purchase items from shopping list 132 maintained by the family's smart refrigerator 122. The HGA adds the shared virtual payment method to a digital wallet of a user based on the user accepting a purchase request (e.g., purchase request 134). Upon receiving user's 102 acceptance of the purchase request 134, the HGA initiates a shopping session with a particular merchant (e.g., merchant 140) and activates the shared virtual payment method within digital wallet 160 for use by user 102. When the shopping session terminates or if a digital transaction during the shopping session violates a restriction of virtual card 162, the HGA removes or deactivates the virtual card 162 from user's 102 digital wallet 160.

In some embodiments, the cardholder of the shared virtual payment method can directly add restrictions (e.g., by way of user input via Family Pickup Interface 130). Additionally, or alternatively, the HGA determines and configures restrictions on the virtual card 162 based on various factors such as user profile or user preferences of the cardholder, past shopping behavior or past shopping transactions (e.g., cardholder only approved transactions under $50), user profile (e.g., authorized user is under 21 years old), among others. Different restrictions on the same virtual card 162 can apply to different users. For example, an age restriction or item restriction can apply to user Johnny 102 but not for user Mom 106.

In some embodiments, the HGA configures digital wallet 160 with user interface elements that provide detailed information relating to the shared virtual payment method. For example, UI elements within digital wallet 160 may display, for virtual card 162, identifying information about the virtual card 162 (e.g., name of the cardholder); current balance 163; periodic activity 164; restrictions 165 (e.g., current list of authorized users, maximum transaction amount limit, list of approved merchants; recent transactions 166; itemized receipts of previous transactions; among others.

Figure 3:
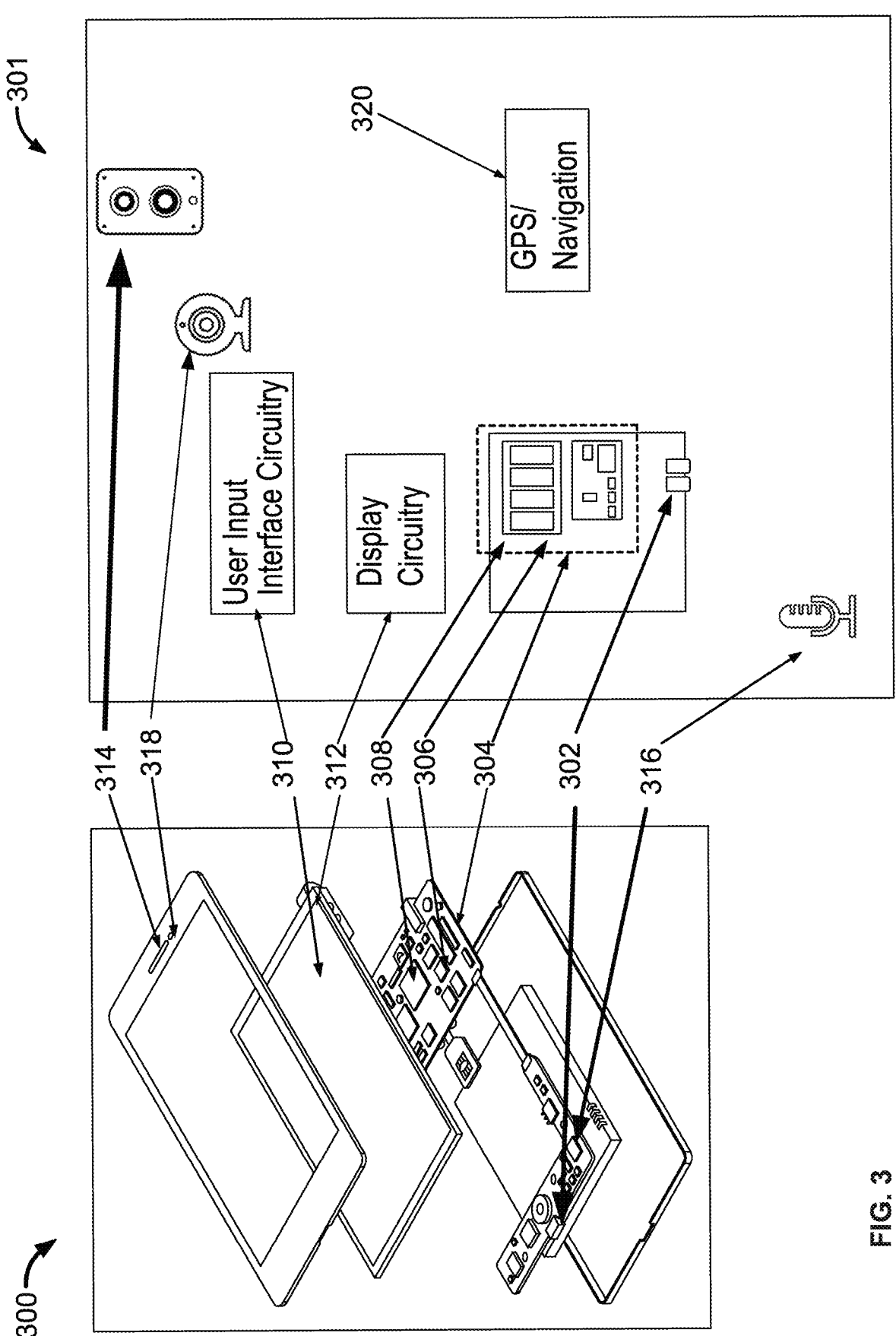
FIG. 3 shows an illustrative user equipment device, in accordance with some embodiments of this disclosure.
Figure 4:
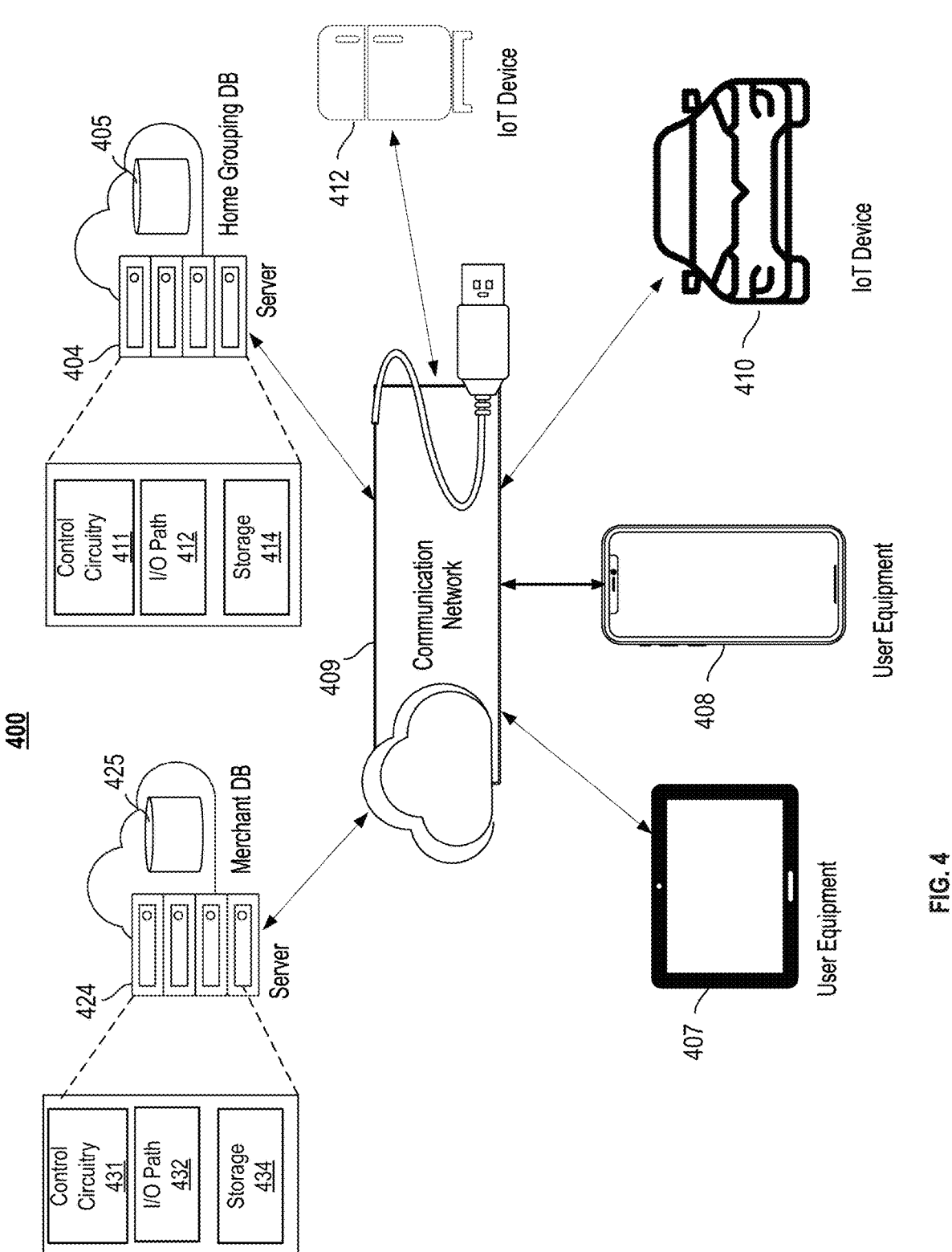
FIG. 4 shows an illustrative system, in accordance with some embodiments of this disclosure.

FIGS. 3-4 depict illustrative devices, systems, servers, and related hardware for a smart transaction system with IoT integration for purchase requests, in accordance with some embodiments of this disclosure. FIG. 3 shows generalized embodiments of illustrative user equipment devices 300 and 301, which may correspond to the above-described user devices (e.g., device 112, 114, 116, IoT devices 122, 113). In some embodiments, user equipment device 300, 301 is a smartphone device, a tablet, smart TV, IoT device, smart assistant device or home assistant device, a camera device or any other suitable computing device, a network-based server hosting a user-accessible client device, a non-user-owned device, any other suitable device, or any combination thereof. Each of user equipment device 300, 301 is communicatively connected to at least one of microphone 316, audio input equipment, camera 318, display circuitry 312, user input interface circuitry 310, and GPS/navigation circuitry 320. For example, display 312 may be a computer display, a 3D display (such as, for example, a tensor display, a light field display, a volumetric display, a multi-layer display, an LCD display or any other suitable type of display, or any combination thereof). For example, user input interface 310 may be a remote-control device.

In some embodiments, each one of user equipment device 300, 301 receives content and data via input/output (I/O) path (e.g., circuitry) 302. I/O path 302 provides data to control circuitry 304, which comprises processing circuitry 306 and storage 308. Control circuitry 304 is used to send and receive commands, requests, and other suitable data using I/O path 302, which comprises I/O circuitry. I/O path 302 connects control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable control circuitry such as processing circuitry 306. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for the HGA or other suitable application stored in memory (e.g., storage 308). Specifically, control circuitry 304 may be instructed by the HGA to perform the functions discussed above and below. In some implementations, processing or actions performed by control circuitry 304 may be based on instructions received from the media application and/or gaze mapping application.

In some client/server-based embodiments, control circuitry 304 may include communications circuitry suitable for communicating with a server or other networks or servers. The HGA is a stand-alone application implemented on a device or a server. The HGA may be implemented as software or a set of executable instructions. The instructions for performing any of the embodiments discussed herein of the HGA may be encoded on non-transitory computer-readable media (e.g., a hard drive, random-access memory on a DRAM integrated circuit, read-only memory on a BLU-RAY disk, etc.). For example, in FIG. 3, the instructions may be stored in storage 308, and executed by control circuitry 304 of a device 300, 301.

In some embodiments, the HGA is a client/server application where only the client application resides on device 300, 301 and a server application resides on an external server (e.g., server 404). For example, the HGA may be implemented partially as a client application on control circuitry 304 of device 300, 301 and partially on server 404, 424 as a server application running on control circuitry 411, 431, respectively. Server 404, 424 may be a part of a local area network with one or more of devices 300, 301 or may be part of a cloud computing environment accessed via the internet. In a cloud computing environment, various types of computing services for performing searches on the internet or informational databases, providing encoding/decoding capabilities, providing storage (e.g., for a database) or parsing data (e.g., using machine learning algorithms described above and below) are provided by a collection of network-accessible computing and storage resources (e.g., server 404, 424), referred to as "the cloud." Device 300, 301 may be a cloud client that relies on the cloud computing capabilities from server 404, 424 to receive and process encoded data. When executed by control circuitry of server 404, 424 the HGA instructs control circuitry 411, 431, respectively, to perform processing tasks for the client device.

Control circuitry 304 may include communications circuitry suitable for communicating with a server, edge computing systems and devices, a table or database server, or other networks or servers. The instructions for carrying out the above-mentioned functionality may be stored on a server (which is described in more detail in connection with FIG. 4). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media application and/or gaze mapping application data described above. Nonvolatile memory may also be used (e.g., to launch a boot-up routine and other instructions). Cloud-based storage, described in relation to FIG. 3, may be used to supplement storage 308 or instead of storage 308.

Control circuitry 304 may include video generating circuitry and tuning circuitry, such as one or more analog tuners, one or more H.265 decoders or any other suitable digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of user equipment 300, 301. Control circuitry 304 may also include digital-to-analog converter circuitry and analog-to-digital converter circuitry for converting between digital and analog signals. The tuning and encoding circuitry may be used by user equipment device 300, 301 to receive and to display, to play, or to record content. The tuning and encoding circuitry may also be used to receive video encoding/decoding data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment device 300, the tuning and encoding circuitry (including multiple tuners) may be associated with storage 308.

Control circuitry 304 may receive instruction from a user by way of user input interface circuitry 310. User input circuitry 310 may be any suitable user interface circuitry, such as a remote control, mouse, trackball, keypad, keyboard, touch screen, touchpad, stylus input, joystick, voice recognition interface, or other user input interfaces. Display 312 circuitry may be provided as a stand-alone device or integrated with other elements of each one of user equipment device 300, 301. For example, display circuitry 312 may be a touchscreen or touch-sensitive display. In such circumstances, user input interface circuitry 310 may be integrated with or combined with display circuitry 312. In some embodiments, user input interface circuitry 310 includes a remote-control device having one or more microphones, buttons, keypads, any other components configured to receive user input or combinations thereof. For example, user input interface circuitry 310 may include a handheld remote-control device having an alphanumeric keypad and option buttons.

Audio output equipment 314 may be integrated with or combined with display circuitry 312. Display circuitry 312 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display circuitry 312. Audio output equipment 314 may be provided as integrated with other elements of each one of device 300 and equipment 301 or may be stand-alone units. An audio component of videos and other content displayed on display circuitry 312 may be played through speakers (or headphones) of audio output equipment 314. In some embodiments, audio may be distributed to a receiver (not shown), which processes and outputs the audio via speakers of audio output equipment 314. In some embodiments, for example, control circuitry 304 is configured to provide audio cues to a user, or other audio feedback to a user, using speakers of audio output equipment 314. There may be a separate microphone 316 or audio output equipment 314 may include a microphone configured to receive audio input such as voice commands or speech. For example, a user may speak letters or words that are received by the microphone and converted to text by control circuitry 304. In a further example, a user may voice commands that are received by a microphone and recognized by control circuitry 304. Camera 318 may be any suitable video camera integrated with the equipment or externally connected. Camera 318 may be a digital camera comprising a charge-coupled device (CCD) and/or a complementary metal-oxide semiconductor (CMOS) image sensor. Camera 318 may be an analog camera that converts to digital images via a video card.

The HGA may be implemented using any suitable architecture. For example, it may be a stand-alone application wholly-implemented on each one of user equipment device 300 and user equipment device 301. In such an approach, instructions of the application may be stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to provide encoding/decoding functionality and preform any of the actions discussed herein. Based on the processed instructions, control circuitry 304 may determine what action to perform when input is received from user input interface circuitry 310. For example, movement of a cursor on a display up/down may be indicated by the processed instructions when user input interface circuitry 310 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the HGA is a client/server-based application. Data for use by a thick or thin client implemented on each one of user equipment device 300 and user equipment device 301 may be retrieved on-demand by issuing requests to a server remote to each one of user equipment device 300 and user equipment device 301. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on device 300, 301. This way, the processing of the instructions is performed remotely by the server while the resulting displays (e.g., that may include text, a keyboard, or other visuals) are provided locally on device 300, 301. Device 300, 301 may receive inputs from the user via input interface circuitry 310 and transmit those inputs to the remote server for processing and generating the corresponding displays. For example, device 300, 301 may transmit a communication to the remote server indicating that an up/down button was selected via input interface circuitry 310. The remote server may process instructions in accordance with that input and generate a display of the application corresponding to the input (e.g., a display that moves a cursor up/down). The generated display is then transmitted to device 300, 301 for presentation to the user.

In some embodiments, the HGA may be downloaded and interpreted or otherwise run by an interpreter or virtual machine (run by control circuitry 304). In some embodiments, the media application and/or gaze mapping application may be encoded in the ETV Binary Interchange Format (EBIF), received by control circuitry 304 as part of a suitable feed, and interpreted by a user agent running on control circuitry 304. For example, the media application and/or gaze mapping application may be an EBIF application. In some embodiments, the media application and/or gaze mapping application may be defined by a series of JAVA-based files that are received and run by a local virtual machine or other suitable middleware executed by control circuitry 304. In some of such embodiments (e.g., those employing MPEG-2 or other digital media encoding schemes), media application and/or gaze mapping application may be, for example, encoded and transmitted in an MPEG-2 object carousel with the MPEG audio and video packets of a program.

FIG. 4 is a diagram of an illustrative system 400, in accordance with some embodiments of this disclosure. System 400 may comprise user equipment devices 407, 408, 410 and/or 412 and/or any other suitable number and types of user equipment, capable of transmitting data by way of communication network 409. Communication network 409 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 409) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 4 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 409.

System 400 may comprise merchant data source 425, home grouping data source 405 and/or one or more servers 401, 404. In some embodiments, the media application and/or gaze mapping application may be executed at one or more of control circuitry 411, 431 of servers 404, 424 respectively (and/or control circuitry of user equipment devices 407, 408, 410, 412).

In some embodiments, servers 404, 424 include control circuitry 411, 431 and storage 414, 434 (e.g., RAM, ROM, Hard Disk, Removable Disk, etc.), respectively. Storage 414, 434 may store one or more databases. Server 404, 424 may also include an input/output path 412, 432, respectively. I/O path 412, 432 may provide encoding/decoding data, device information, or other data, over a local area network (LAN) or wide area network (WAN), and/or other content and data to control circuitry 411, 431, which may include processing circuitry, and storage 414, 434, respectively. Control circuitry 411, 431 may be used to send and receive commands, requests, and other suitable data using I/O path 412, 432, respectively, which may comprise I/O circuitry. I/O path 412, 432 may connect control circuitry 411, 431, respectively (and specifically control circuitry) to one or more communications paths.

Control circuitry 411, 431 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 411, 431 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 411, 431 executes instructions for an emulation system application stored in memory (e.g., the storage 414, 434, respectively). Memory may be an electronic storage device provided as storage 414, 434 that is part of control circuitry 411, 431, respectively.

Home grouping data source 405, merchant data source 425, servers 404, 424, or any combination thereof, may include an encoder. Such encoder may comprise any suitable combination of hardware and/or software configured to process data to reduce storage space required to store the data and/or bandwidth required to transmit the image data, while minimizing the impact of the encoding on the quality of the media content being encoded. In some embodiments, the data to be compressed may comprise a raw, uncompressed 3D media content, or 3D media content in any other suitable format. In some embodiments, each of user equipment devices 407, 408, 410 and/or 412 may receive encoded or encoded data locally or over a communication network (e.g., communication network 409 of FIG. 4) and may comprise one or more decoders. Such decoder may comprise any suitable combination of hardware and/or software configured to convert data in a coded form to a form that is usable as video signals and/or audio signals or any other suitable type of data signal, or any combination thereof. User equipment devices 407, 408, 410 and/or 412 may be provided with encoded data. In some embodiments, at least a portion of decoding may be performed remote from user equipment devices 407, 408, 410 and/or 412.

FIGS. 5-10 are system sequence diagrams and flowcharts of various processes 500-1000, respectively. In various embodiments, the individual steps of each process 500-1000 may be implemented by one or more components of the devices and systems of FIGS. 3-4. Although the present disclosure may describe certain steps of each process 500-1000 (and of other processes described herein) as being implemented by certain components of the devices and systems of FIGS. 3-4, this is for purposes of illustration only, and it should be understood that other components of the devices and systems of FIGS. 3-4 may implement those steps instead. For example, the steps of each process 500-1000 may be executed by server 404, 425 and/or by user equipment device 407, 408, 410, and/or 412 and/or by control circuitry 304 of a device 300, 301 to provide smart transactions and navigation for purchase requests associated with IoT device-managed shopping lists.

Figure 5:
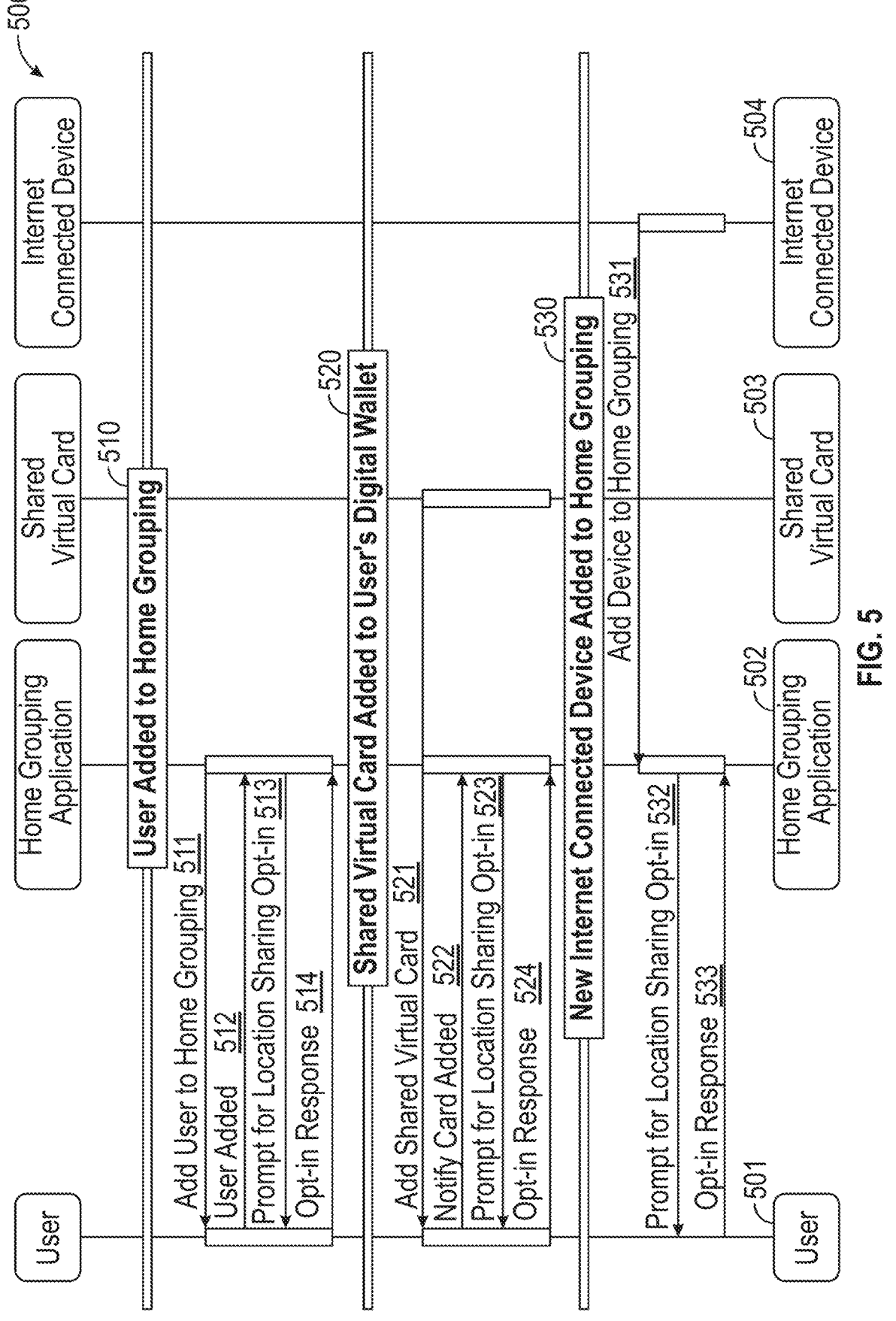
FIG. 5 is a system sequence diagram of an illustrative process of integrating IoT systems, virtual payment systems, and navigation systems using a cohesive interface, in accordance with various embodiments of the disclosure.

FIG. 5 is a system sequence diagram of an illustrative process 500 of integrating IoT systems, virtual payment systems, and navigation systems using a cohesive interface, in accordance with various embodiments of the disclosure. In some embodiments, the integration comprises adding 510 a user(s) (e.g., a user profile or user account of the user) of a household to a home grouping (e.g., a group of users or user profiles or user accounts), adding 520 a shared virtual card to a digital wallet of the added user 501, and adding 530 an IoT device to the home grouping. In some embodiments, the integration further includes the control circuitry communicating with (e.g., by way of Family Pickup Interface 130) navigation systems that are integrated with the added IoT devices (e.g., navigation systems of a smart vehicle) and/or user devices associated with the added user 501.

In some instances, at step 511, control circuitry (e.g., control circuitry 411, 431 of FIG. 4 and/or control circuitry 304 of FIG. 3) identifies a user 501 to add to the home grouping associated with a household. At step 512, control circuitry adds (e.g., by way of Home Grouping Application (HGA) 502) user 501 to the home grouping.

In some instances, at step 513, control circuitry sends a prompt to the added user 501 (e.g., by way of a user device associated with user 501) with an option to opt in to sharing their location data (e.g., actual location and/or approximate location) with the HGA 502 and/or with other users or IoT devices of the home grouping. While a user may be opted in to share their location data with HGA 502, control circuitry can maintain the user's location data as private or share with other users, applications, or devices (which are already added to the home grouping) only the user's approximate location instead of the user's actual location. Control circuitry uses the location data of the users in the home grouping to determine which user is near a merchant such that it would be convenient for that user to detour from their current route to purchase items from the shopping list at the merchant. At step 514, HGA 502 receives the opt in response from user 501.

In some instances, at step 521, control circuitry adds a shared virtual card 503 (such as virtual card 162) to a digital wallet associated with user 501. The shared virtual card may belong to another user of the home grouping (e.g., the cardholder) who authorizes the user 501 to use for paying items from the purchase request. Control circuitry adds the digital wallet of user 501 based on receiving from the user 501 an acceptance of the purchase request, so that the user of 501 can use the shared virtual card 503 to pay for the shopping items in the purchase request. At step 522, control circuitry notifies the cardholder that their shared virtual card 503 has been added to the digital wallet of user 501. In some instances, at step 523, each time a virtual payment method belonging to another user has been added to the digital wallet of user 501, control circuitry sends a prompt to the user 501 to opt in to share their location data with HGA 502. For example, control circuitry may use location data of the user 501 to implement or enforce various restrictions associated with the shared virtual card 503. At step 524, HGA 502 receives the opt in response from user 501.

In some instances, at step 531, control circuitry identifies and adds IoT device(s) 504 located within and/or associated with the household. For example, IoT device 504 may comprise a smart refrigerator associated with a shared account of the household or a smart vehicle associated with a user(s) in the household. Users added to the home grouping can access the IoT device, which maintains a shared shopping list for the home grouping. Additionally or alternatively, control circuitry can access a navigation system (if applicable) of IoT device 504 to provide navigation instructions to guide a user in the home grouping to a merchant for fulfilling a purchase request. In some instances, at step 532, control circuitry sends user 501 a prompt with an option to opt in to sharing their location with the newly added IoT device 504. At step 533, the HGA 502 receives the opt in response from user 501.

Figure 6:
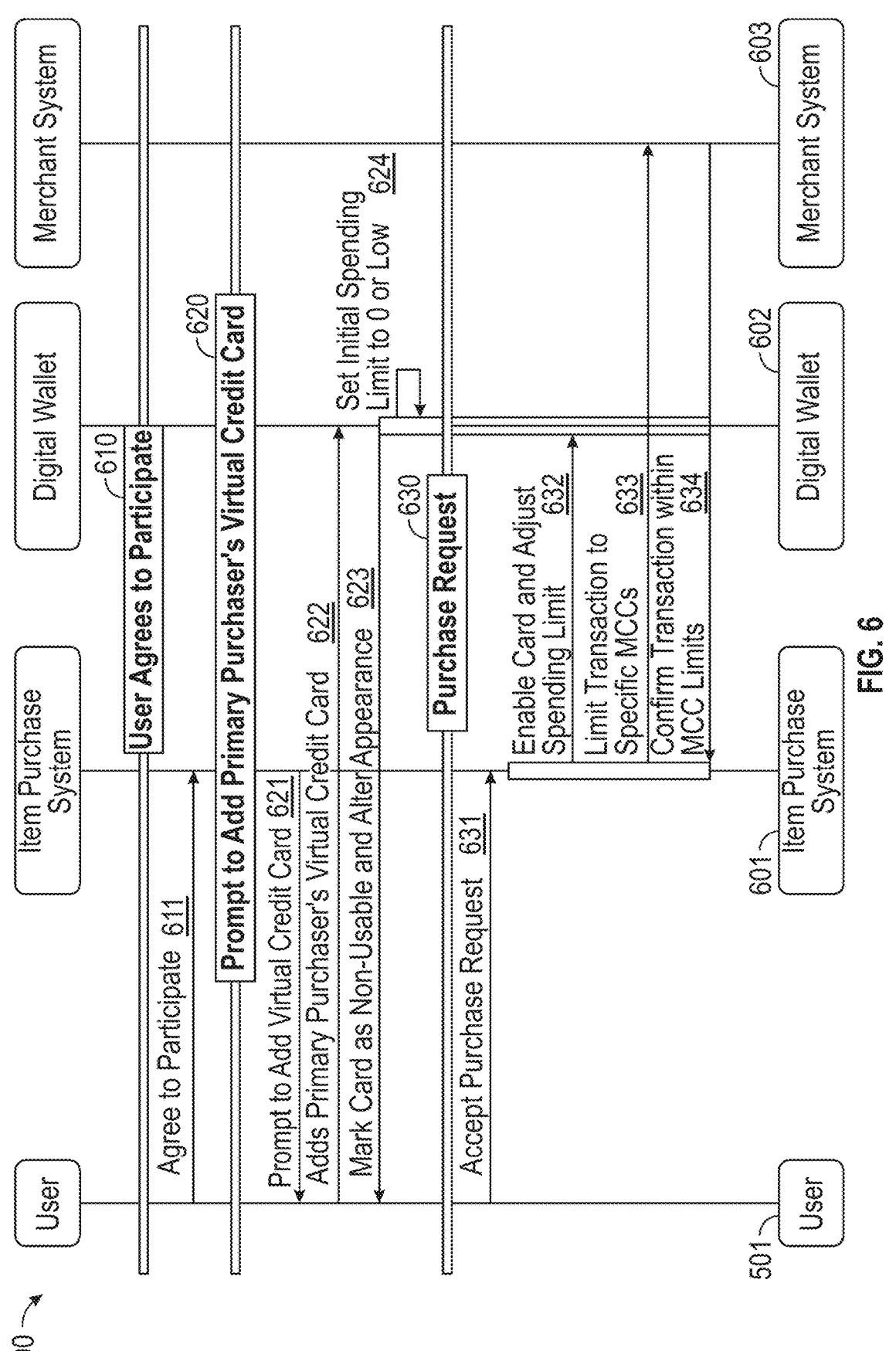
FIG. 6 is a system sequence diagram of an illustrative process of implementing restrictions on a virtual payment method using a cohesive interface integrating IoT systems, virtual payment systems, and navigation systems, in accordance with various embodiments of the disclosure.

FIG. 6 is a system sequence diagram of an illustrative process 600 of implementing restrictions on a virtual payment method using a cohesive interface integrating IoT systems, virtual payment systems, and navigation systems, in accordance with various embodiments of the disclosure. In some embodiments, implementing virtual payment restrictions comprises receiving 610 user acceptance to participate in an item purchase system 601 (e.g., which corresponds to HGA 502 of FIG. 5), prompting 620 to add a primary purchaser's (e.g., cardholder) virtual credit card, and applying 630 the virtual payment restrictions on the virtual credit card during fulfillment of the purchase request.

In some instances, at step 611, the item purchase system 601 receives user's 501 agreement to participate in receiving purchase requests and fulfilling the purchase requests that they accept. For example, agreement to participate comprises adding user 501 to the home grouping. Agreement to participate can also include user's 501 opting in to share their location data, which control circuitry can use to determine whether user 501 is nearby a merchant to fulfill a purchase request.

In some instances, at step 621, based on the user 501 agreeing to participate in the item purchase system 601 (e.g., by way of control circuitry) transmits a prompt to a primary purchaser (e.g., cardholder) to add the primary purchaser's virtual credit card to a digital wallet of user 501. The primary purchaser may be the primary user of a shared account associated with the household (e.g., home grouping). In some instances, at step 622, upon receiving approval from the primary purchaser, control circuitry adds the primary purchaser's virtual credit card to user's 501 digital wallet. In some instances, at step 623, control circuitry marks the added virtual credit card as non-usable and alters the appearance of the card within the user's 501 digital wallet. In some instances, at step 624, control circuitry automatically sets initial restrictions on the virtual credit card within user's 501 digital wallet. For example, the initial spending limit for the virtual credit card may be set at $0 or a low amount (e.g., below a specific amount).

In some instances, at step 631, the item purchase system 601 receives user's 501 acceptance to fulfill a purchase request. In some instances, at step 632, upon receiving the acceptance from user 501, control circuitry automatically enables the virtual credit card for use. User's 501 authorization to use the virtual credit card may be temporary (e.g., limited to the transaction for the purchase request). Additionally, control circuitry may concurrently raise or lower the spending limit on the virtual credit card for a transaction based on the quantity and/or nature of shopping items in the purchase request. In some instances, at step 633, control circuitry applies restrictions that limit transactions to merchants whose Merchant Category Code (MCC) matches those of merchants previously known to the item purchase system 601 or approved by a primary user. For example, such merchants may be determined based on previous transactions within the user's 501 digital wallet, or through an API (e.g., by way of merchant system 603) where merchant IDs may be mapped to MCCs. In some instances, when the user is fulfilling the purchase request at a merchant, control circuitry validates the transaction. For example, control circuitry may confirm that the transaction is being executed at a merchant whose MCC code is within MCC limits (e.g., has an approved MCC code for the purchase request).

Figure 7:
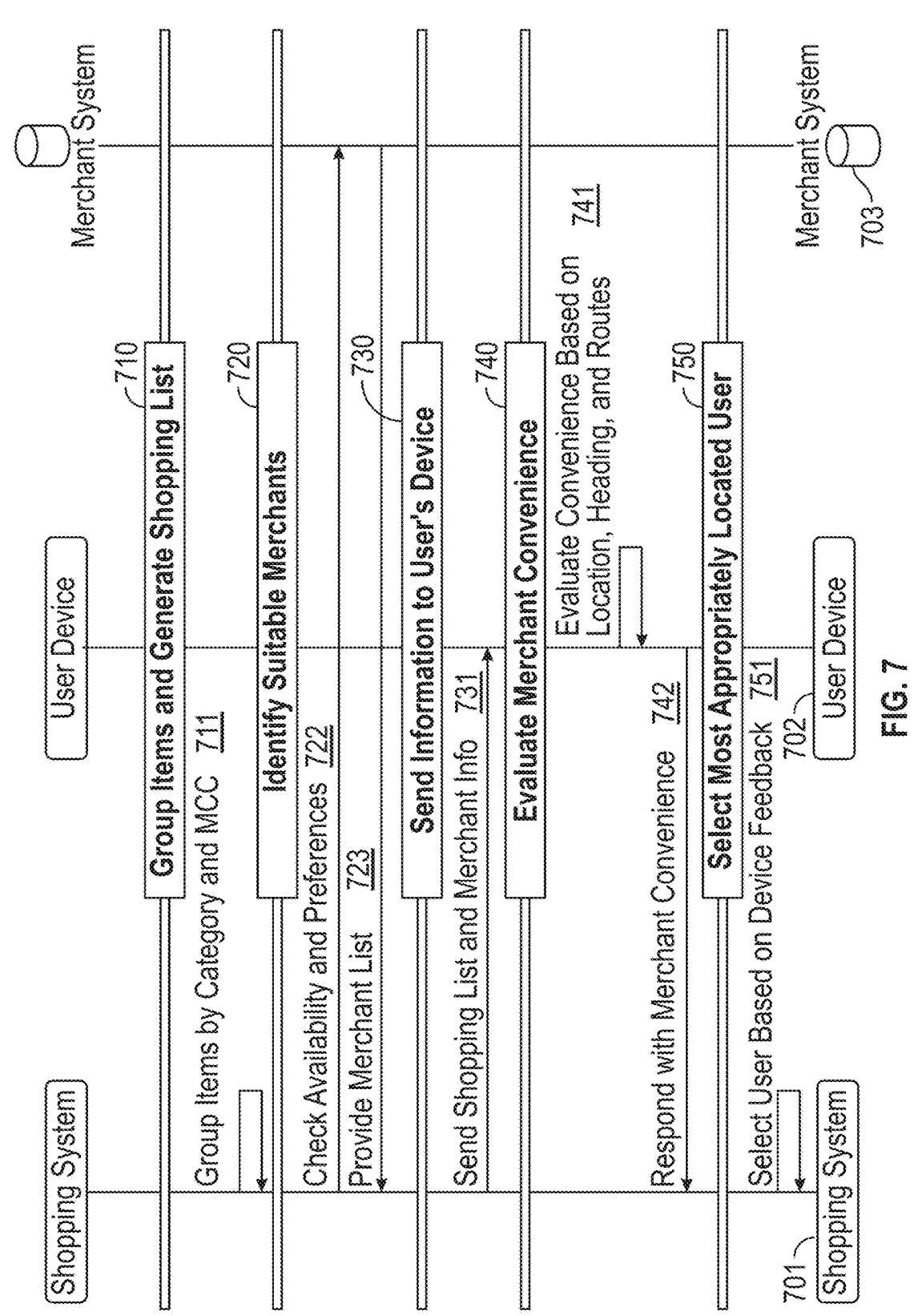
FIG. 7 is a system sequence diagram of an illustrative process of determining shopping items for a purchase request and a user for fulfilling the purchase request, using a cohesive interface integrating IoT systems, virtual payment systems, and navigation systems, in accordance with various embodiments of the disclosure.

FIG. 7 is a system sequence diagram of an illustrative process 700 of determining shopping items for a purchase request and a user for fulfilling the purchase request, using a cohesive interface integrating IoT systems, virtual payment systems, and navigation systems, in accordance with various embodiments of the disclosure. In some embodiments, the determination comprises grouping items and generating 710 a shopping list, identifying 720 suitable merchants, sending 730 the shopping information to the user's device, evaluating 740 merchant convenience, and selecting 750 the most appropriately located user among users of the home grouping.

In some instances, at step 711, control circuitry groups items from a shared shopping list. Control circuitry then selects a group of items to include in a purchase request. For example, items may be grouped by category; merchant (e.g., items which are offered by certain merchant types such as grocery; pharmacy; home improvement; supercenter; merchant MCC; merchant location); priority or urgency (e.g., a perishability rating associated with items, items flagged as needed within an immediate time period, items needed by a certain date); regulated items (e.g., alcohol, items which require parental approval), and so forth.

In some instances, at step 722, control circuitry (e.g., by way of shopping system 701) queries merchant system 603 for availability of merchants that offer the selected items of the purchase request and/or which match user preferences or restrictions on the shared virtual card 503 (e.g., preference to shop at a particular merchant). At step 723, control circuitry provides a list of matching merchants based on the query to shopping system 701.

In some instances, at step 731, control circuitry compiles a shopping list of the selected grouped items and matching merchants and sends the compiled list to a user device 702 associated with user 501. In some embodiments, control circuitry evaluates which merchant is most convenient for user 501 to visit to fulfill the purchase request. A merchant may be determined convenient when a route deviation score of the merchant is less than a predetermined deviation threshold associated with user 501. In some embodiments, the route deviation score is based on various factors, such as a distance between the merchant's location and a given point along a navigation route of user 501, location of the merchant, hours of operation of the merchant, current date or time of day, traffic conditions, location of the user 501, the direction or destination through which user 501 is headed, historical routes of user 501, among others or a combination thereof. Additionally, or alternatively, control circuitry solicits direct feedback from user 501 to identify which merchant is most convenient to the user. At step 742, control circuitry transmits to shopping system 701 the identification of the merchant determined as most convenient for the user 501.

In some embodiments, steps 711 through 742 are performed for each user in the home grouping. In some instances, at step 751, based on identifying which merchant is convenient for each user, control circuitry selects the user most appropriately located to fulfill the purchase request. For example, control circuitry may associate a convenience score for each user relative to the purchase request and their respectively identified convenient merchant. The user with the highest convenience score may be selected as the most appropriately located user to fulfill the purchase request. In another example, control circuitry may determine which user is currently located the closest to their respective identified convenient merchant.

In another example, control circuitry may calculate a difference between the predetermined deviation threshold for each user and a route deviation score of a merchant (identified as convenient for the respective user). Control circuitry may select the user with the lowest difference as the most appropriately located user to fulfill the purchase request.

In some embodiments, the control circuitry sends status updates of the purchase request (e.g., that user 501 is selected as the most appropriately located user to fulfill the purchase request, that user 501 has accepted the purchase request) to users of the home grouping. Control circuitry can update the accepted purchase request in real time, for example, by soliciting the users in the home grouping for additional items, sending notification updates on the status of purchases, or sending urgent alerts for needed items.

Figure 8:
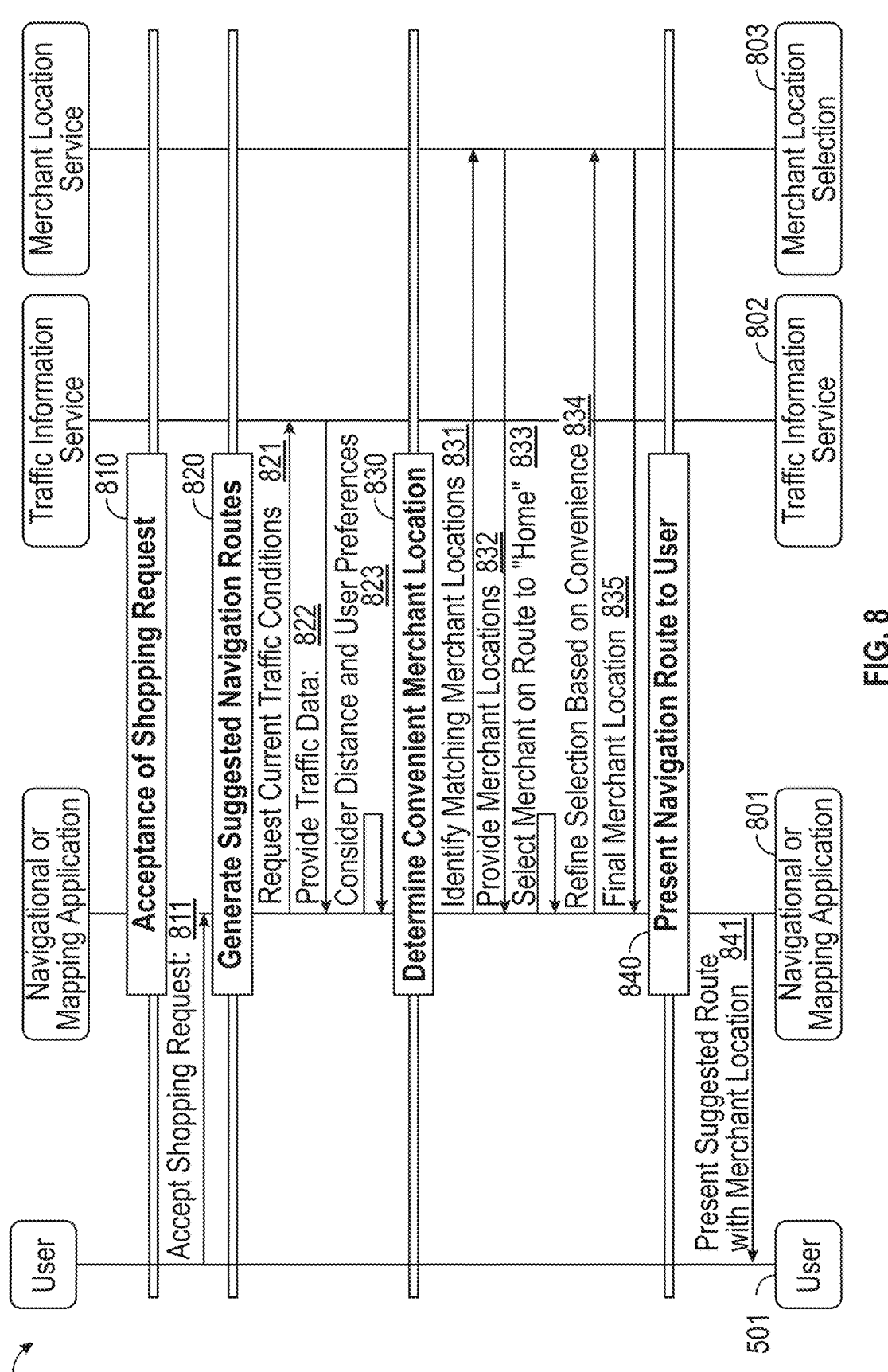
FIG. 8 is a system sequence diagram of an illustrative process of generating navigation instructions for a user fulfilling a purchase request using a cohesive interface integrating IoT systems, virtual payment systems, and navigation systems, in accordance with various embodiments of the disclosure.

FIG. 8 is a system sequence diagram of an illustrative process 800 of generating navigation instructions for a user fulfilling a purchase request using a cohesive interface integrating IoT systems, virtual payment systems, and navigation systems, in accordance with various embodiments of the disclosure. In some embodiments, the generation of navigation instructions comprises receiving 810 a user acceptance of the purchase request (also referred to as shopping request), generating 820 suggested navigation routes, determining 830 a convenient merchant location, and presenting 840 the navigation route to the user.

In some instances, at step 811, navigation application 801 receives a user's 501 acceptance of the purchase request. In some embodiments, the navigation application 801 comprises a navigation or mapping system of a user device or vehicle associated with the user 501. In some instances, at step 821, control circuitry (e.g., by way of navigation application 801) queries a traffic information service 802 for current traffic conditions. At step 822, traffic information service 802 provides the relevant traffic data. At step 823, control circuitry calculates a potential navigation route(s) based on various factors, such as the distance between user's 501 location and the merchant location as well as user preferences.

In some instances, at step 831, control circuitry identifies a matching merchant(s) from among available merchants 803 (or available merchants 803 as restricted based on user preferences). For example, the matching merchant(s) is located within a certain range of the user's 501 current or predicted location and/or of a certain point along the user's 501 current navigation route. At step 832, control circuitry provides locations of the matching merchants to navigation application 801. In some instances, at step 833, control circuitry identifies a merchant(s) located along or within a certain range of a route directed toward the user's 501 destination (e.g., home). At step 834, control circuitry refines the selection of identified merchants based on convenience to the user 501. For example, control circuitry may compare the root deviation score of each identified merchant with the predetermined deviation threshold associated with user 501. If the route deviation score of the identified merchant is less than (e.g., does not equal or does not exceed) the predetermined deviation threshold, then control circuitry selects that merchant as the final merchant location. In some examples, if multiple identified merchants each have a route deviation score that is less than the predetermined deviation threshold, then control circuitry may calculate the difference between the predetermined deviation threshold and the route deviation score for each identified merchant, and select the merchant with the lowest difference.

In some instances, at step 835, control circuitry provides the determined final merchant location to the navigation application 801, which generates a navigation route with the final merchant location as the destination (or an intermediary destination). At step 841, control circuitry may provide the navigation route to user 501 (e.g., by way of a navigation application 801).

Figure 9:
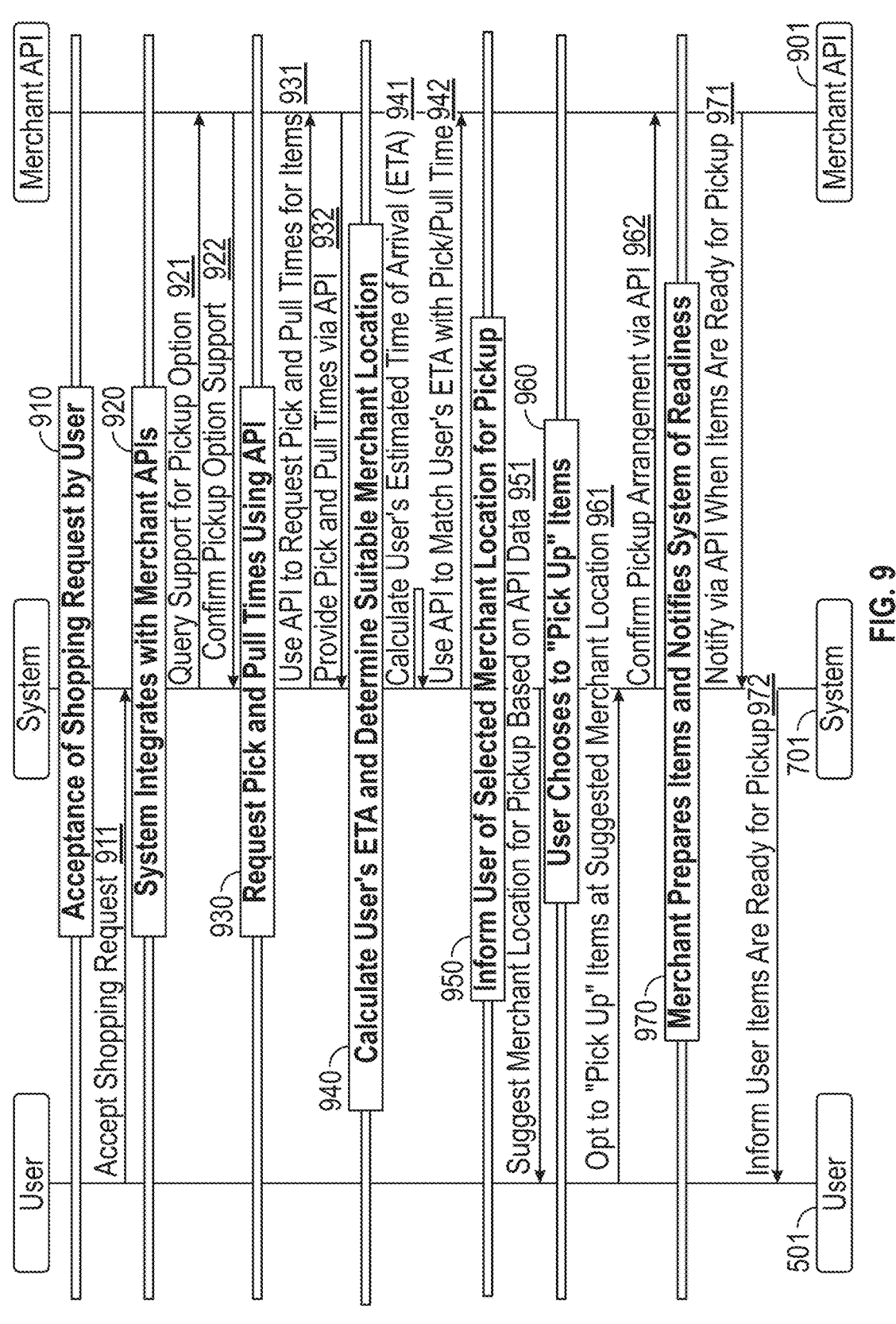
FIG. 9 is a system sequence diagram of an illustrative process of integrating merchant APIs with a cohesive interface integrating IoT systems, virtual payment systems, and navigation systems for picking up shopping items, in accordance with various embodiments of the disclosure.

FIG. 9 is a system sequence diagram of an illustrative process 900 of integrating merchant APIs with a cohesive interface integrating IoT systems, virtual payment systems, and navigation systems for picking up shopping items, in accordance with various embodiments of the disclosure. In some embodiments, the process comprises receiving 910 a user acceptance of a purchase request, integrating 920 shopping system 701 with merchant API, requesting 930 pick and pull times using the merchant API, calculating 940 the user's estimated time of arrival (ETA) and determining a suitable merchant location, informing 950 the user of the selected merchant location for pickup, receiving 960 user's selection to pick up items, and instructing 970 the merchant to prepare the items and notifying the user when the items are ready for pickup.

In some instances, at step 911, control circuitry (e.g., by way of shopping system 701) receives user's 501 acceptance of the purchase request. At step 921, control circuitry queries merchant API 901 whether various local merchants support a pickup option. At step 922, merchant API 901 confirms that pickup option is supported for the merchant. At step 931, control circuitry sends a request to merchant API 901 for pick and pull times of each merchant for items in the purchase request, which merchant API 901 provides at step 932. At step 941, control circuitry calculates the user's 501 ETA at each merchant. At step 942, based on matching the user's 501 ETA information with the pick-n-pull times of each merchant, control circuitry determines a suitable merchant location for the user 501.

In some instances, at step 951, control circuitry may send a notification to user 501 suggesting the merchant location for pickup. At step 961, if control circuitry receives a user selection to opt for pickup at the suggested merchant location, then, at step 962, control circuitry sends to the suggested merchant, via merchant API 901, confirmation of the pickup arrangement. At step 971, when control circuitry receives, via merchant API 901, from the suggested merchant notification that the items are ready for pick up, then, at step 972, control circuitry notifies user 501 that pickup is ready.

Figure 10:
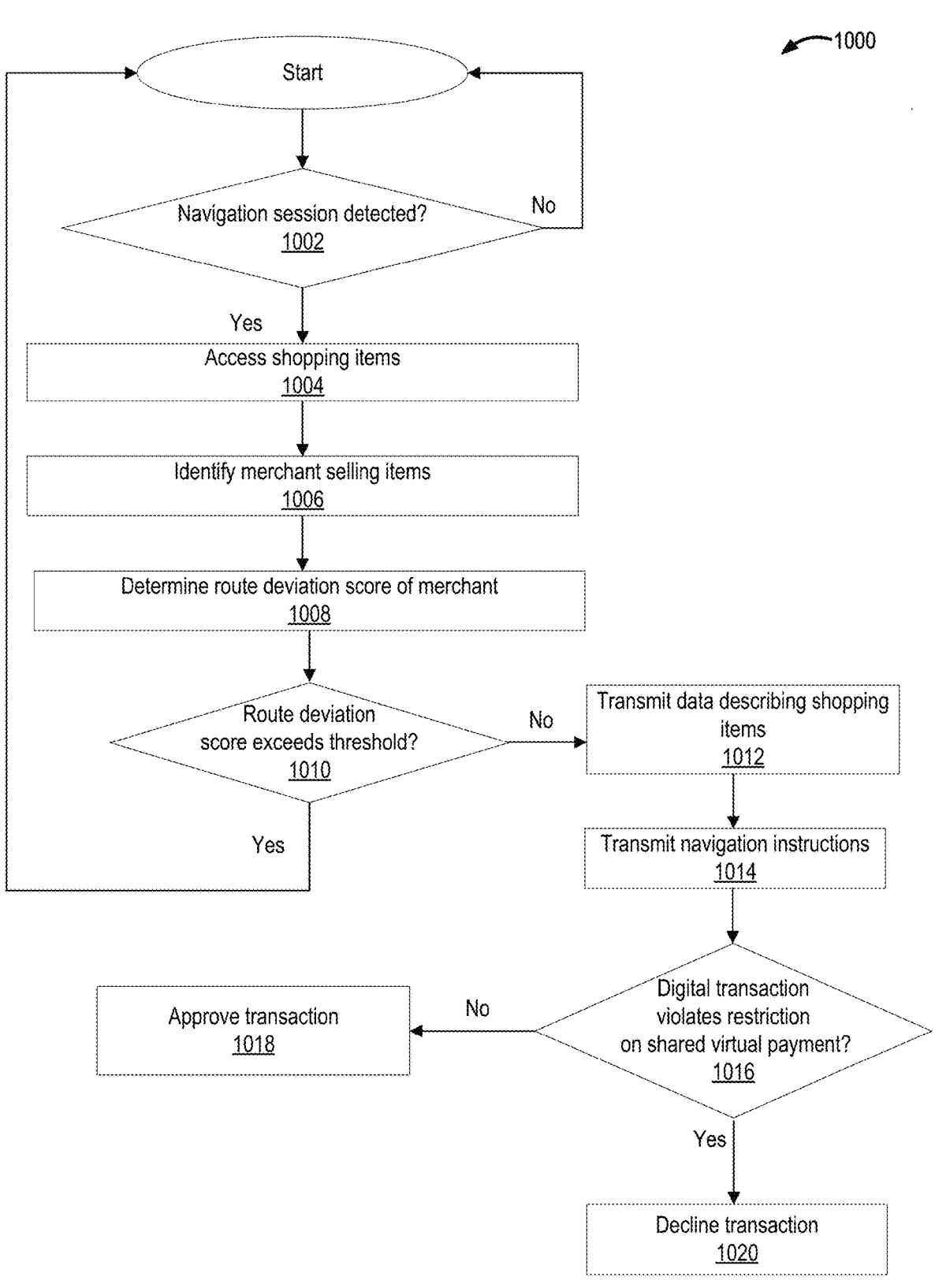
FIG. 10 is a flowchart of an example process for providing smart transactions using a cohesive interface integrating IoT systems, navigation systems, and virtual payment systems, in accordance with various embodiments of the disclosure.

FIG. 10 is a flowchart of an example process 1000 for providing smart transactions using a cohesive interface integrating IoT systems, navigation systems, and virtual payment systems, in accordance with various embodiments of this disclosure. In some embodiments, at step 1002, control circuitry detects whether a navigation route has been initiated for a navigation device associated with a user. If a navigation session is active, then, at step 1004, control circuitry accesses shopping items from a shared shopping list, wherein shopping items were added to the shopping list by an IoT device. At step 1006, control circuitry identifies a merchant location that sells the shopping items. At step 1008, control circuitry determines a route deviation score for the merchant location based on the navigation route.

At step 1010, control circuitry compares the route deviation score for the merchant location with a predetermined deviation threshold associated with the navigation device. The route deviation score does not exceed the predetermined deviation threshold, then, at step 1012, control circuitry transmits data to the navigation device describing the shopping items. For example, the data may be transmitted in the form of a purchase request.

At step 1014, control circuitry transmits data causing the merchant location to be added as an intermediary stop on the route. For example, the control circuitry may update the current navigation route of the navigation device such that the merchant location is an intermediary destination before the original destination.

At step 1016, control circuitry enables a digital financial transaction for a user device associated with the user at the merchant location. For example, control circuitry may add a shared virtual payment method belonging to another user to a digital wallet associated with the user device, and authorize the user to use the virtual payment method to purchase the shopping items at the merchant location. The virtual payment method may be associated with various restrictions on the digital financial transaction. At step 1016, control circuitry determines whether the digital financial transaction violates a restriction of the shared virtual payment method. If there is a violation, the control circuitry declines the digital financial transaction at step 1020. Otherwise, control circuitry approves the transaction at step 1018.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   detecting initiation of a navigation route for a navigation device associated with a user;
   accessing at least one of a plurality of shopping items in a shopping list, wherein at least a portion of the plurality of shopping items was added to the shopping list by an IoT device;
   identifying a merchant location selling the at least one of the plurality of shopping items;
   determining a route deviation score for the merchant location based on the navigation route;
   determining whether the route deviation score for the merchant location based on the navigation route meets or exceeds a predetermined deviation threshold associated with the navigation device; and if the route deviation score for the merchant location based on the navigation route does not meet or exceed the predetermined deviation threshold associated with the navigation device:

(i) transmitting data describing the at least one of the plurality of shopping items;

(ii) transmitting data causing the merchant location to be added as an intermediary stop on the navigation route; and (iii) enabling a digital financial transaction for a user device associated with the user at the merchant location.

2. The method of claim 1, further comprising:

authorizing the user device to use, for the digital financial transaction, a virtual payment method associated with a second user; and activating payment security for the virtual payment method based on at least one restriction associated with the digital financial transaction.

3. The method of claim 2, wherein the at least one restriction is determined based on metadata associated with the virtual payment method, the metadata including at least one of: a transaction amount limit, a time limit, an age limit, merchant identity, the merchant location, a limit on a type of item, or a limit on a quantity of an item.

4. The method of claim 1, wherein the predetermined deviation threshold is determined based on at least one of: a predicted location of the navigation device at a given time, a distance between the merchant location and a current location or the predicted location of the navigation device, historical navigation route data of the navigation device, user preferences associated with the navigation device, a current mode of transportation of the navigation device, a destination of the at least one of the plurality of shopping items, a destination of the navigation route, a priority level associated with the item, or environmental condition data.

5. The method of claim 4, wherein the predicted location is determined based on historical shopping behavior associated with a user profile associated with the navigation device, preferred routes associated with the user profile, frequented merchants within a period of time associated with the user profile.

6. The method of claim 1, wherein the at least one of the plurality of shopping items is grouped based on at least one of an item category, a merchant category, or a priority level.

7. The method of claim 1, further comprising:

updating the navigation route based on the merchant location and a mode of transportation of the navigation device.

8. The method of claim, 1 further comprising:

sending a notification to each of a plurality of user devices confirming that the data describing the at least one of the plurality of shopping items has been transmitted to the user device;

providing each of the plurality of user devices with an option to update the plurality of shopping items; and in response to receiving a selection to update the plurality of shopping items, causing the IoT device to update the shopping list with the updated plurality of shopping items.

9. The method of claim 8, wherein the shopping list identifies which user device added each shopping item in the plurality of shopping items;

and further comprising:

restricting addition of shopping items to the plurality of shopping items based on the identified user device.

10. The method of claim 1, wherein identifying the merchant location further comprises:

determining that the at least one of the plurality of shopping items is available for purchase at the merchant location and that the merchant location offers an option to pick up the at least one of the plurality of shopping items; and determining that an estimated time for pickup of the at least one of the plurality of shopping items at the merchant location corresponds with an estimated arrival time of the user device at the merchant location.

11. The method of claim 1, wherein the at least the portion of the plurality of shopping items was added to the shopping list based on a voice command received by the IoT device.

12. The method of claim 1, wherein the navigation device is the user device.

13. A system comprising:

control circuitry configured to:

detect initiation of a navigation route for a navigation device associated with a user;

access at least one of a plurality of shopping items in a shopping list, wherein at least a portion of the plurality of shopping items was added to the shopping list by an IoT device;

identify a merchant location selling the at least one of the plurality of shopping items;

determine a route deviation score for the merchant location based on the navigation route;

determine whether the route deviation score for the merchant location based on the navigation route meets or exceeds a predetermined deviation threshold associated with the navigation device; and if the route deviation score for the merchant location based on the navigation route does not meet or exceed the predetermined deviation threshold associated with the navigation device:

input/output circuitry configured to:

(i) transmit data describing the at least one of the plurality of shopping items; and (ii) transmit data causing the merchant location to be added as an intermediary stop on the navigation route; and wherein the control circuitry is further configured to:

(iii) enable a digital financial transaction for a user device associated with the user at the merchant location.

14. The system of claim 13, wherein the control circuitry is further configured to:

authorize the user device to use, for the digital financial transaction, a virtual payment method associated with a second user; and activate payment security for the virtual payment method based on at least one restriction associated with the digital financial transaction.

15. The system of claim 14, wherein the at least one restriction is determined based on metadata associated with the virtual payment method, the metadata including at least one of: a transaction amount limit, a time limit, an age limit, merchant identity, the merchant location, a limit on a type of item, or a limit on a quantity of an item.

16. The system of claim 13, wherein the predetermined deviation threshold is determined based on at least one of: a predicted location of the navigation device at a given time, a distance between the location of the merchant location and a current location or the predicted location of the navigation device, historical navigation route data of the navigation device, user preferences associated with the navigation device, a current mode of transportation of the navigation device, a destination of the at least one of the plurlaity of shopping items, a destination of the navigation route, a priority level associated with the item, or environmental condition data.

17. The system of claim 16, wherein the predicted location is determined based on historical shopping behavior associated with a user profile associated with the navigation device, preferred routes associated with the user profile, frequented merchants within a period of time associated with the user profile.

18. The system of claim 13, wherein the at least one of the plurality of shopping items is grouped based on at least one of an item category, a merchant category, or a priority level.

19. The system of claim 13, wherein the control circuitry is further configured to:

update the navigation route based on the merchant location and a mode of transportation of the navigation device.

20. The system of claim 13:

wherein the input/output circuitry is further configured to:

send a notification to each of a plurality of user devices confirming that the data describing the at least one of the plurality of shopping items has been transmitted to the user device; and provide each of the plurality of user devices with an option to update the plurality of shopping items; and wherein the control circuitry is further configured to:

in response to receiving a selection to update the plurality of shopping items, cause the IoT device to update the shopping list with the updated plurality of shopping items.

* * * * *